(12) United States Patent
Okutani et al.

(10) Patent No.: US 9,913,084 B2
(45) Date of Patent: Mar. 6, 2018

(54) HANDS-FREE SPEECH COMMUNICATION DEVICE FOR AN EMERGENCY CALL SYSTEM

(71) Applicant: Hosiden Corporation, Yao-shi, Osaka (JP)

(72) Inventors: Junichi Okutani, Yao (JP); Eiki Fujii, Yao (JP); Kiyoshi Miyazawa, Yao (JP); Yoshito Fujimoto, Yao (JP); Yasuhiro Tsuneki, Yao (JP); Shunji Muraoka, Yao (JP)

(73) Assignee: HOSIDEN CORPORATION, Yao-Shi (JP)

( * ) Notice: Subject to any disclaimer, the term of this patent is extended or adjusted under 35 U.S.C. 154(b) by 0 days.

(21) Appl. No.: 15/650,086

(22) Filed: Jul. 14, 2017

(65) Prior Publication Data

US 2018/0027369 A1    Jan. 25, 2018

(30) Foreign Application Priority Data

Jul. 20, 2016   (JP) .................................. 2016-142334

(51) Int. Cl.
*H04R 5/02* (2006.01)
*H04W 4/02* (2018.01)
(Continued)

(52) U.S. Cl.
CPC ............... *H04W 4/02* (2013.01); *B60Q 1/52* (2013.01); *B60R 21/01* (2013.01); *G01S 19/17* (2013.01);
(Continued)

(58) Field of Classification Search
CPC ....... H04M 19/04; H04M 2021/01061; H04W 4/02; H04W 4/16; H04R 1/02; H04R 5/02;
(Continued)

(56) References Cited

U.S. PATENT DOCUMENTS

2003/0063759 A1*  4/2003  Brennan ................ H04R 3/005
                                                            381/92
2007/0165875 A1*  7/2007  Rezvani .............. H04M 1/6066
                                                            381/74
(Continued)

FOREIGN PATENT DOCUMENTS

JP        2009-290789        12/2009

*Primary Examiner* — William A Jerez Lora
(74) *Attorney, Agent, or Firm* — Rankin, Hill & Clark LLP

(57) ABSTRACT

A speech communication device includes microphones configured with: microphones M1 and M2 disposed at positions which are axisymmetric with a centerline in a width direction of a housing as a symmetric axis; and a microphone M3 disposed at a position which is on the centerline and closer to a speaker than the microphones M1 and M2 are. The speech communication device is further equipped with: a sound processor which includes: a beam former which is connected to the microphones M1 and M2 and forms a bidirectionality in which directionality is strong in two directions each perpendicular to the centerline and is weak in two directions each along the centerline; and an echo cancel unit which is connected to the beam former and the microphone M3 and removes a sound signal having been output from the microphone M3 from a sound signal having been output from the beam former.

15 Claims, 39 Drawing Sheets

(51) Int. Cl.
  *H04M 19/04*    (2006.01)
  *B60Q 1/52*     (2006.01)
  *G01S 19/17*    (2010.01)
  *B60R 21/01*    (2006.01)
  *G08G 1/00*     (2006.01)
  *H04W 4/16*     (2009.01)

(52) U.S. Cl.
  CPC ............ *G08G 1/205* (2013.01); *H04M 19/04* (2013.01); *B60R 2021/01061* (2013.01); *H04W 4/16* (2013.01)

(58) Field of Classification Search
  CPC .......... H04B 1/082; H04B 1/086; B60Q 1/52; B60R 21/01; G01S 19/17; G08G 1/205
  USPC .. 381/302, 86, 91, 122, 124, 66, 93, 95, 96, 381/94.1, 94.2, 94.3, 94.5, 94.6, 94.7, 381/94.8, 94.9
  See application file for complete search history.

(56) References Cited

U.S. PATENT DOCUMENTS

| | | | |
|---|---|---|---|
| 2015/0016642 A1* | 1/2015 | Walsh .................... | H04S 7/301 381/307 |
| 2016/0275961 A1* | 9/2016 | Yu ......................... | G10K 11/16 |

* cited by examiner

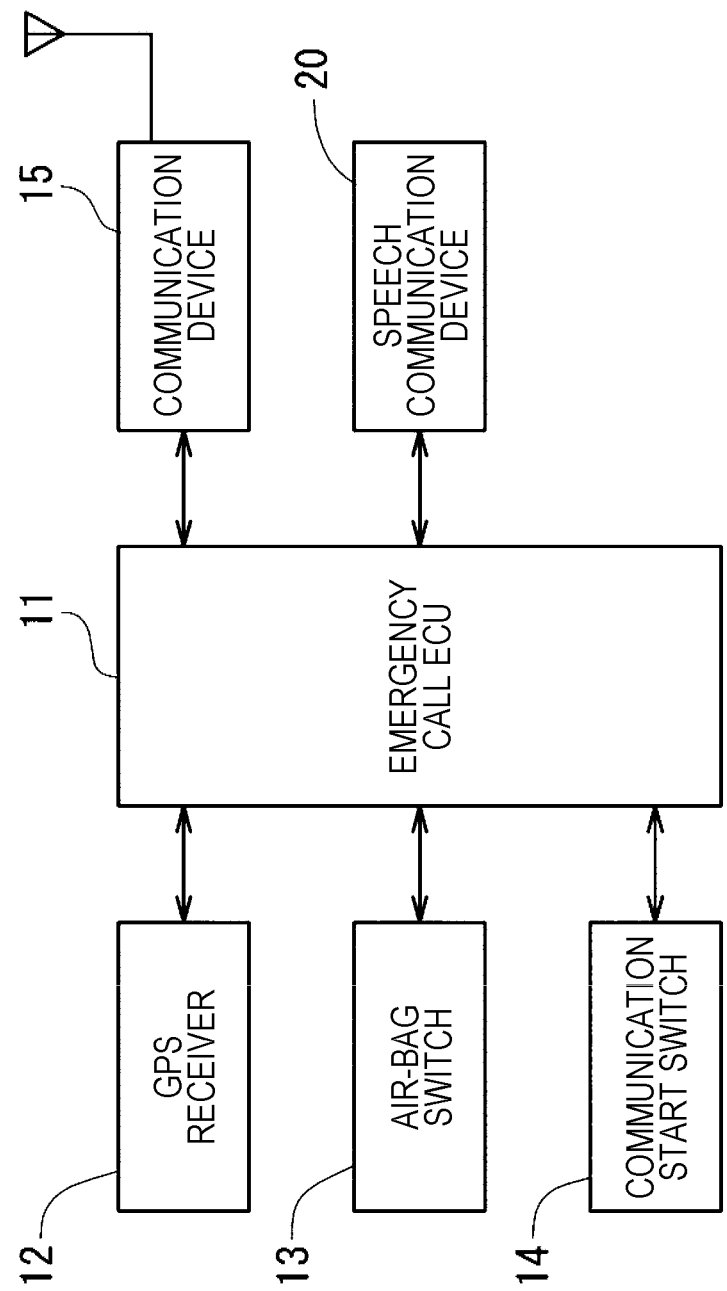

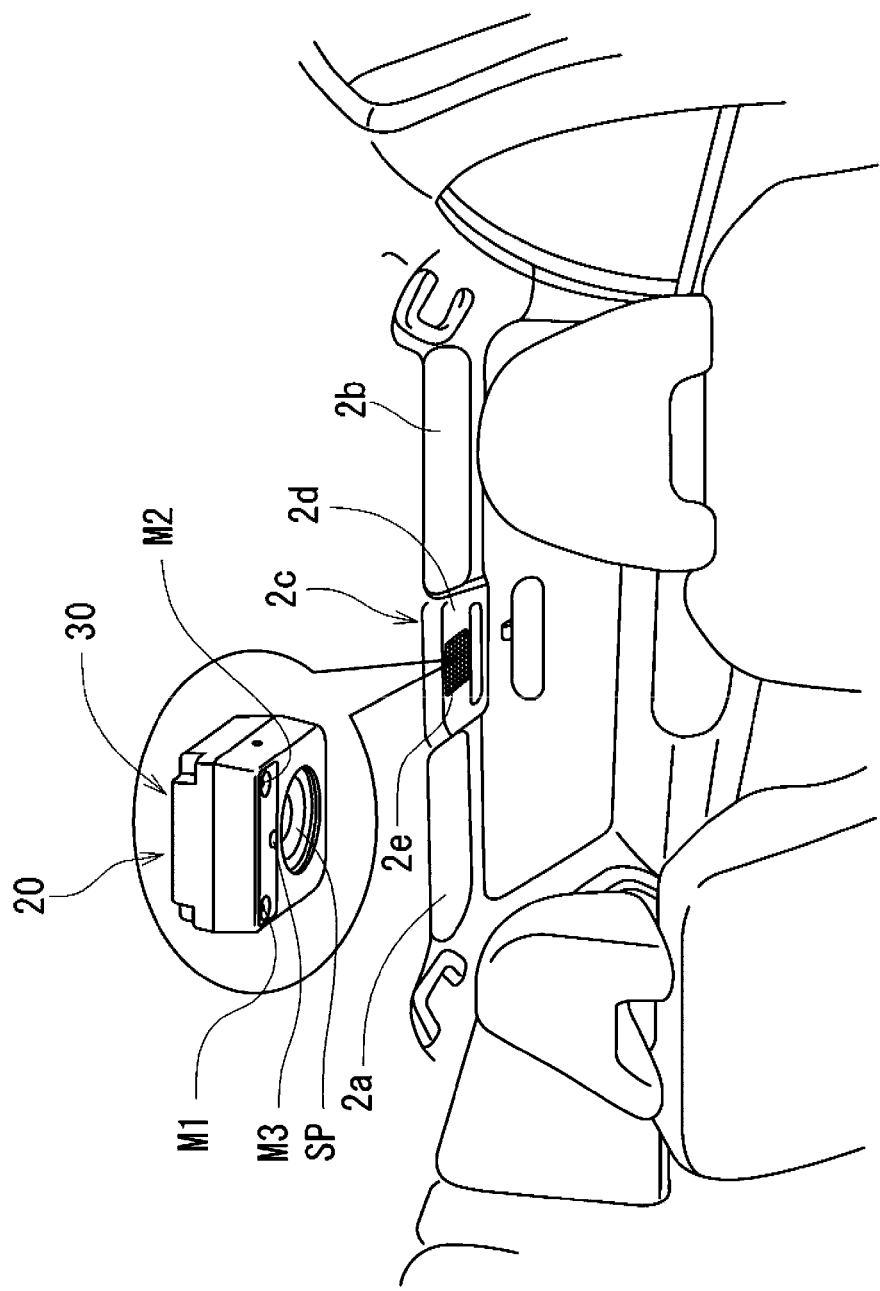

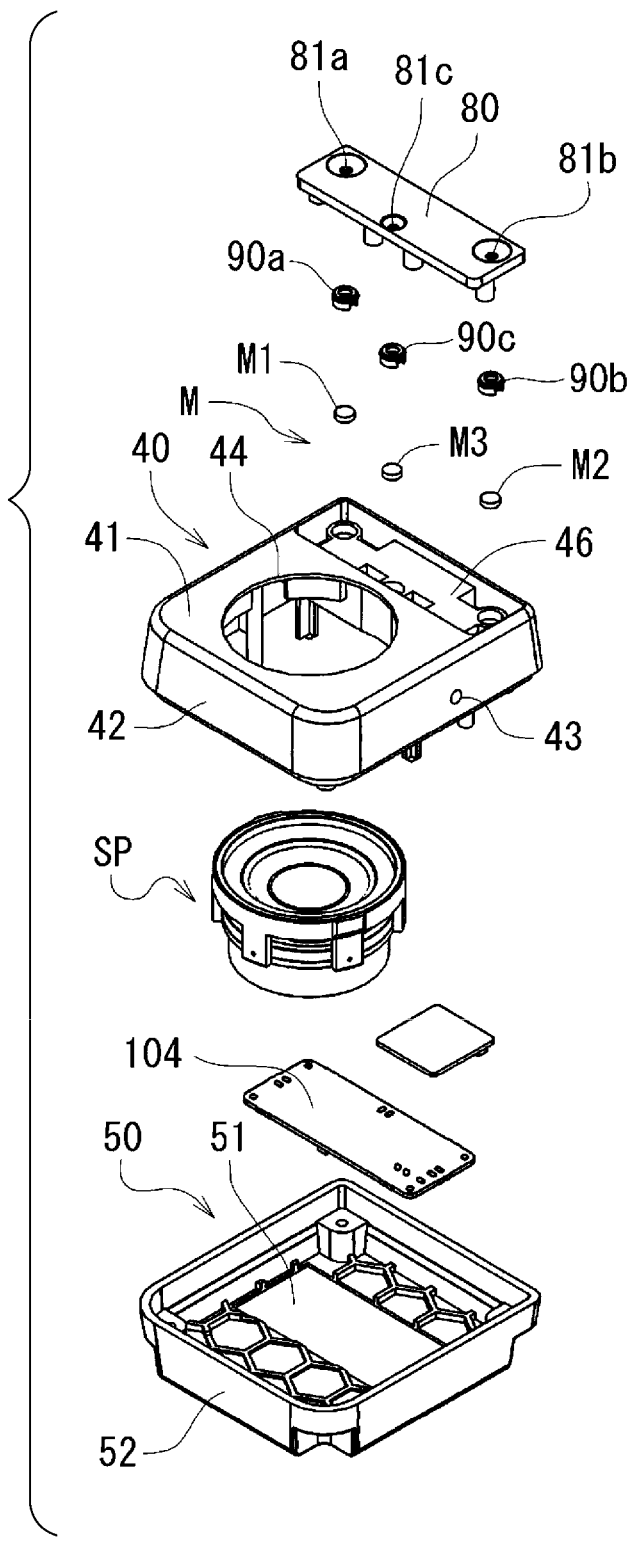

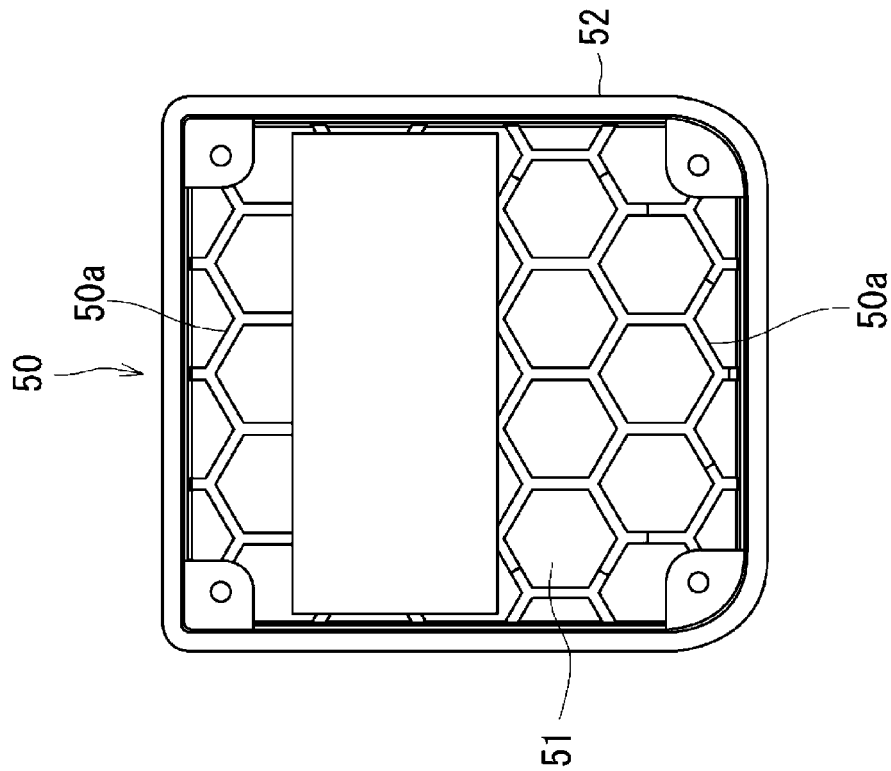
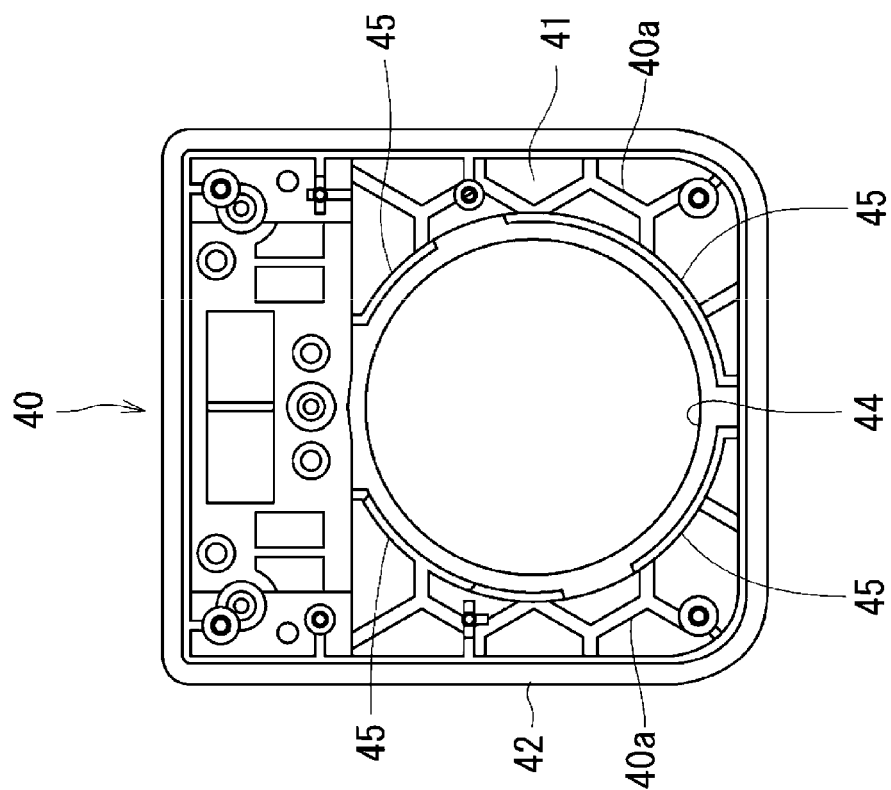

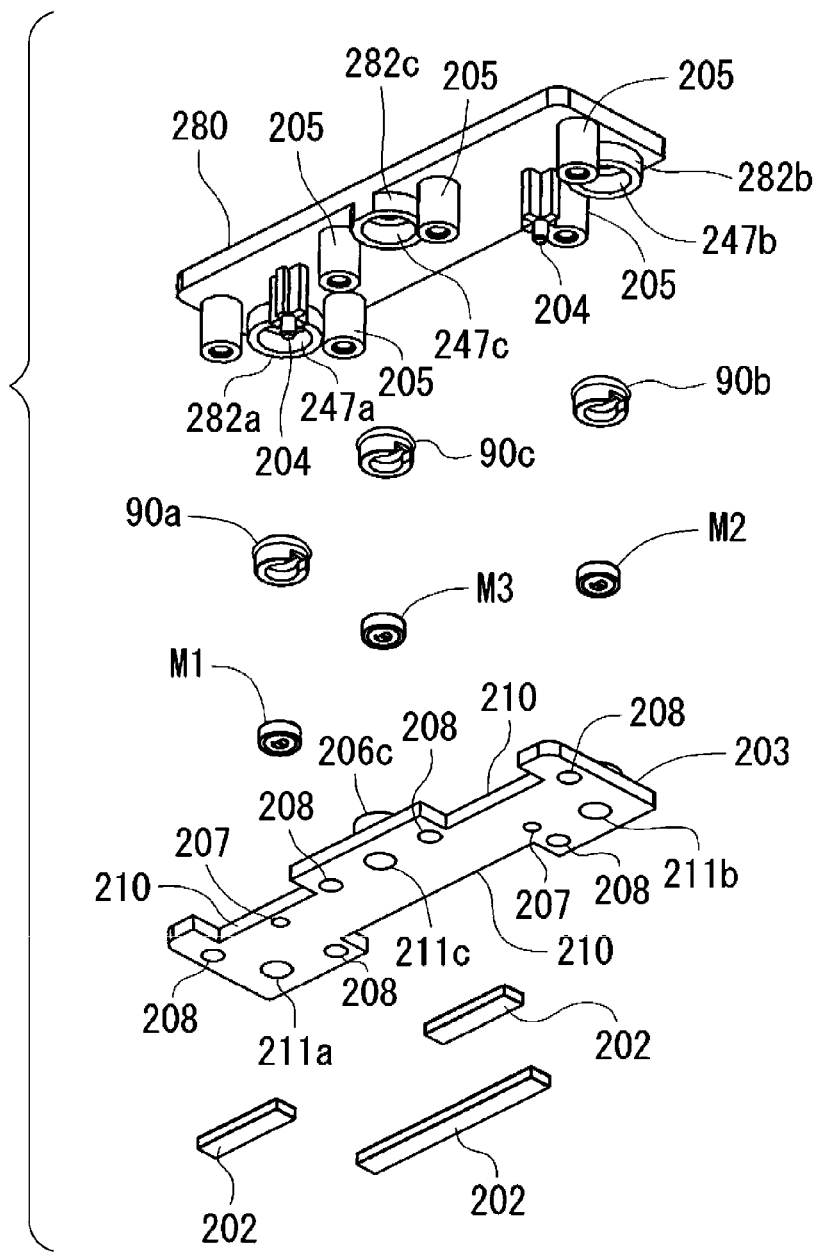

HANDS-FREE SPEECH COMMUNICATION DEVICE FOR AN EMERGENCY CALL SYSTEM

BACKGROUND OF THE INVENTION

(1) Field of the Invention

The present invention relates to a hands-free speech communication device for an emergency call system and, in particular, to a hands-free speech communication device for an emergency call system of a speaker and microphone integrated type in which the speaker and the microphone are housed in the same housing.

(2) Description of Related Art

An emergency call system is known which establishes a communication line to an emergency call center when an emergency happens to a vehicle or the occupant (for example, see Japanese Patent Application Laid-Open No. 2009-290789). With such an emergency call system, the occupant of a vehicle is able to talk hands-free with an operator of an emergency call center, using a speaker and a microphone installed in the vehicle cabin; however, when a conversation sound emitted from the speaker comes into the microphone, the sound returned to the communication party as an echo and hampers the conversation. To address this issue, an echo canceller employing an adaptive filter is used.

In the emergency call system as described above, the speaker and the microphone are separately disposed in the vehicle cabin, and the distance between the speaker and the microphone is different between vehicle models; therefore, it is necessary to adjust sound processing on an echo canceller and the like, depending on the vehicle model.

In such an emergency call system, in order to address this issue, there is a need for a hands-free speech communication device for an emergency call system which is of a speaker and microphone integrated type in which a speaker and a microphone are housed in the same housing so that the speaker and the microphone can be fixed at the same distance regardless of a vehicle model and there is no need for adjustment of sound processing, depending on the vehicle model.

SUMMARY OF THE INVENTION

However, in the hands-free speech communication device for an emergency call system of a speaker and microphone integrated type in which the speaker and the microphone are housed in the same housing, because the distance between the speaker and the microphone is so short that the echo coming into the microphone from the speaker is larger; therefore, it is difficult to control the echo canceller. In addition, the vibration from the speaker is easily transferred to the microphone through the housing. As described above, in the hands-free speech communication device for an emergency call system of a speaker and microphone integrated type in which the speaker and the microphone are housed in the same housing, there is a problem that a sound quality is likely to be deteriorated with the microphone strongly affected by the speaker.

The present invention is made in view of such a problem, and an object of the present invention is to provide a hands-free speech communication device for an emergency call system of a speaker and microphone integrated type in which the speaker and the microphone are housed in the same housing while reducing the influence of the speaker to the microphone.

Item 1. A hands-free speech communication device for an emergency call system, the hands-free speech communication device includes: a housing disposed in a vehicle cabin; a speaker which is housed in the housing and outputs from a first surface of the housing a reception sound of a communication party; and a microphone which is housed in the housing and collects sound from the first surface of the housing. The microphone includes: first and second omnidirectional microphones disposed at positions which are axisymmetric with a line segment as a symmetric axis, where the line segment extends in a radial direction from a center of a diaphragm of the speaker; and a third omnidirectional microphone disposed at a position which is on the symmetric axis and is closer to the speaker than the first and second omnidirectional microphones are. The hands-free speech communication device further includes a sound processor including: a beam former which is connected to the first and second omnidirectional microphones and forms a bidirectionality in which directionality is strong in two directions each perpendicular to the symmetric axis and is weak in two directions each along the symmetric axis; and an echo cancel unit which is connected to the beam former and the third omnidirectional microphone and removes a sound signal having been output from the third omnidirectional microphone from a sound signal having been output from the beam former.

According to this hands-free speech communication device for an emergency call system, the sound processor causes the beam former connected to the first and second omnidirectional microphones to form the bidirectionality in which directionality is strong in the two directions each perpendicular to the symmetric axis and is weak in the two direction each along the symmetric axis, in other words, the sound processor weakens the directionality of the microphone in the direction toward the speaker; therefore, it is possible to reduce an echo coming into the microphone from the speaker. Further, the sound processor causes the echo cancel unit connected to the beam former and the third omnidirectional microphone to remove the sound signal having been output from the third omnidirectional microphone from the sound signal having been output from the beam former; therefore, it is possible to extract only a voice generated by an occupant with high quality.

Item 2. In the hands-free speech communication device for an emergency call system according to Item 1, the housing is disposed at a ceiling central part between right and left sun visors in the vehicle cabin such that the first surface of the housing is directed downward, the microphone is located behind the speaker, and the symmetric axis extends in a front and back direction of a vehicle.

According to this hands-free speech communication device for an emergency call system, the directionality is weakened in the front and back direction viewed from the ceiling central part between the right and left sun visors in the vehicle cabin and is strengthened in the right and left direction; therefore, it is possible to collect voices of occupants behind the wheel and in the passenger's seat.

Item 3. In the hands-free speech communication device for an emergency call system according to Item 1, on the first surface of the housing, there are provided a sound emission hole provided at a position facing the diaphragm of the speaker; a microphone housing recessed part which houses the microphone; a microphone cover which covers the microphone housing recessed part; and sound collection holes provided in the microphone cover.

According to this hands-free speech communication device for an emergency call system, the microphones can be put into the microphone housing recessed part from the first surface side of the housing; therefore, it is easy to assemble.

Item 4. In the hands-free speech communication device for an emergency call system according to Item 3, in the microphone housing recessed part, there are provided first, second, and third microphone housing parts each of which separately houses each of the microphones.

According to this hands-free speech communication device for an emergency call system, it is easy to position the microphones.

Item 5. The hands-free speech communication device for an emergency call system according to Item 4 includes microphone holders which are made of a resilient material and are respectively housed, together with the microphones, in the first, second, and third microphone housing parts such that the microphone holders are fit on outer circumferences of the microphones and are respectively held between outer circumferential surfaces of the microphones and inner peripheral surfaces of the first, second, and third microphone housing parts.

According to this hands-free speech communication device for an emergency call system, it is possible to reduce the vibration transferred from the speaker to the microphone through the housing by means of the microphone holders.

Item 6. The hands-free speech communication device for an emergency call system according to Item 3 includes first, second, and third microphone housing parts each of which is provided in the microphone cover to house each of the microphones such that the first, second, and the third microphone housing parts project from an inner surface of the microphone cover; and a cushion member both surfaces of which are given adhesiveness and which is provided to fix the microphone cover on the microphone housing recessed part. A gap is provided between the microphone housing recessed part and the microphone cover.

According to this hands-free speech communication device for an emergency call system, it is possible to reduce the vibration transferred from the speaker to the microphone through the housing by means of the cushion member.

Item 7. The hands-free speech communication device for an emergency call system according to Item 3 includes: an air permeable cushion member which is to be fit in the microphone housing recessed part; and first, second, and third microphone housing parts provided on the cushion member such that the first, second, and third microphone housing parts each house each of the microphones.

According to this hands-free speech communication device for an emergency call system, it is possible to reduce the vibration transferred from the speaker to the microphone through the housing by means of the cushion member.

Item 8. In the hands-free speech communication device for an emergency call system according to Item 1, the microphone is disposed such that a diaphragm of the microphone vibrates in two directions each perpendicular to a vibration direction of the diaphragm of the speaker.

According to this hands-free speech communication device for an emergency call system, it is possible to reduce influence of the vibration transferred from the speaker to the microphones through the housing.

According to the present invention, it is possible to provide a hands-free speech communication device for an emergency call system of a speaker and microphone integrated type in which the speaker and the microphone are housed in the same housing, and at the same time, it is possible to reduce influence of the speaker to the microphone.

BRIEF DESCRIPTION OF THE DRAWINGS

FIG. 2 is a block diagram of the emergency call device;

FIG. 3 is a diagram showing how a speech communication device of a first embodiment is installed;

FIG. 4A is an exploded perspective view of the speech communication device, viewed from above with the front surface directed upward;

FIG. 13A shows a front view of a microphone housing recessed part (front view of the microphone cover), FIG. 13B shows a front view of the microphone housing recessed part when the microphone cover 80 in FIG. 13A is drawn transparent, and FIG. 13C shows a front view of the microphone housing recessed part when the microphone holders and the microphones in FIG. 13B are drawn transparent;

FIGS. 14A and 14B are diagrams each showing an inner surface of the housing, FIG. 14A is a rear view of a front case, and FIG. 14B is a front view of a rear case;

FIG. 20 is a perspective view, viewed from below, of a microphone cover, microphone holders, microphones, a plate, and cushion members which are exploded in FIG. 19.

FIG. 21A shows a front view of a microphone housing recessed part (a front view of the microphone cover), FIG. 21B shows a front view of the microphone housing recessed part when the microphone cover in FIG. 21A is drawn transparent, FIG. 21C shows a front view of the microphone housing recessed part when the microphone holders and the microphones in FIG. 21B are drawn transparent, and FIG. 21D shows a front view of the microphone housing recessed part when the fixing plate and the cushion members in FIG. 21C are drawn transparent;

FIG. 28A shows a front view of a microphone housing recessed part (a front view of a microphone cover), FIG. 28B shows a front view of the microphone housing recessed part when the microphone cover in FIG. 28A is drawn transparent, FIG. 28C shows a front view of the microphone housing recessed part when a microphone front face pressing sponge in FIG. 28B is drawn transparent, and FIG. 28D shows a front view of the microphone housing recessed part when a microphone fixing sponge, the microphones, and a microphone back face pressing sponge in FIG. 28C are drawn transparent;

FIG. 34A shows a front view of a microphone housing recessed part (a front view of a microphone cover), FIG. 34B shows a front view of the microphone housing recessed part when the microphone cover in FIG. 34A is drawn transparent, and FIG. 34C shows a front view of the microphone housing recessed part when the microphones and microphone holders in FIG. 34B are drawn transparent;

DETAILED DESCRIPTION OF PREFERRED EMBODIMENTS

Hereinafter, aspects for practicing the present invention will be described with reference to the drawings while exemplifying embodiments.

First Embodiment

Figure 1:
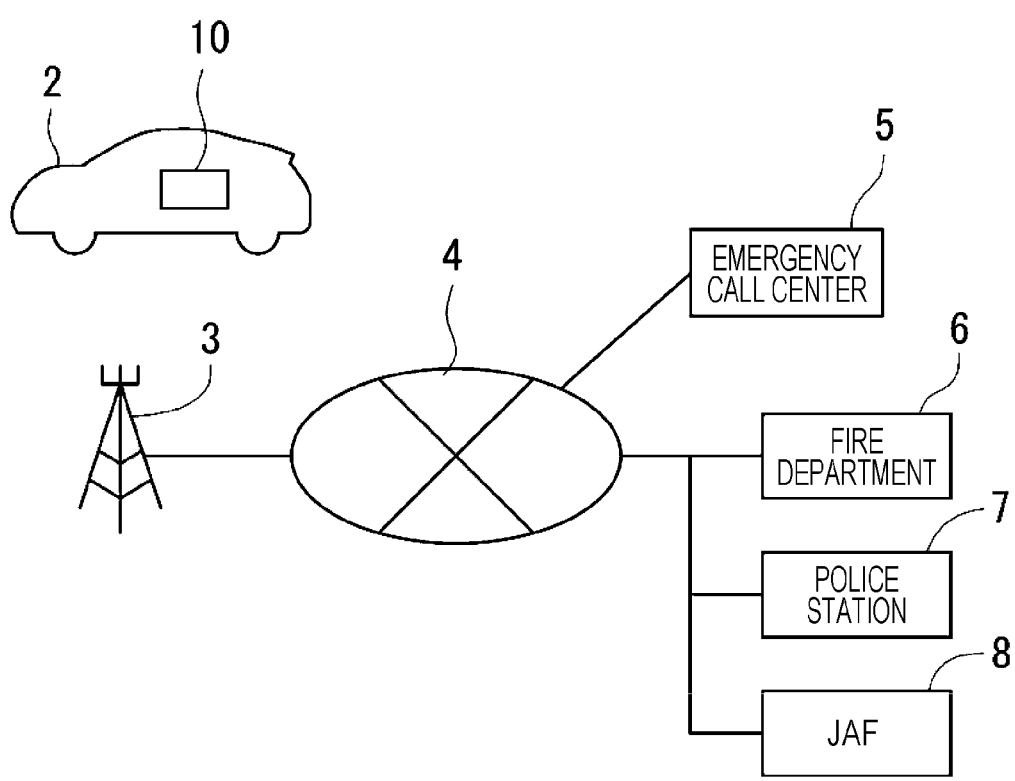
FIG. 1 is a schematic configuration diagram of an emergency call system.

FIG. 1 shows a schematic configuration diagram of an emergency call system 1. A vehicle 2 is equipped with an emergency call device 10, which can communicate by radio with an emergency call center 5, and connects to the emergency call center 5 through a portable telephone network, a base station 3 in a public telephone line network, and a network 4 at a time of emergency so that the occupant can talk with an operator at the emergency call center 5. In addition, if necessary, the operator at the emergency call center 5 asks a fire department 6, a police station 7, or Japan Automobile Federation (JAF) 8 to hurry to the vehicle.

FIG. 2 shows a block diagram of the emergency call device 10. The emergency call device 10 is controlled by an emergency call ECU 11. The emergency call ECU 11 is connected to: a GPS receiver 12 which detects a position of the vehicle 2, based on a radio wave from a GPS satellite; an air-bag switch 13 which detects an operation of an air-bag; a communication start switch 14 which is operated by the occupant to start a speech communication with the emergency call center 5; a communication device 15 used to connect to the emergency call center 5; and a hands-free speech communication device 20 for an emergency call system of a speaker and microphone integrated type (hereinafter, referred to as a "speech communication device") of the present embodiment in which a speaker SP and a microphone M are housed together in the same housing 30.

The emergency call ECU 11 is configured as a computer equipped with a CPU, a ROM, a RAM, and an input/output interface.

The communication device 15 is, for example, a data communication unit with a speech function or an occupant's smartphone. When the communication device 15 performs data communication, the communication device 15 can establish a data link according to, for example, the PPP protocol to send and receive data through the network 4 and through the upper layer TCP/IP protocol or the like. Through this data link, at a time of emergency, a data set is automatically transferred to the emergency call center 5, and the data set includes information such as a vehicle model and a fuel type previously registered in the emergency call ECU 11, position information of the vehicle 2 acquired by the GPS receiver 12, and the like.

In the case that the communication device 15 is a smartphone, the emergency call ECU 11 and the communication device 15 are detachably connected to each other by wire or radio. When connected by wire, a USB cable is used for connection, for example; and when connected by radio, the Bluetooth (registered trade mark) communication standard is used for connection, for example.

The emergency call ECU 11 is equipped with an input device such as a switch, and in response to a user's operation on the input device, the emergency call ECU 11 performs a process to relay the on-hook/off-hook instruction to the communication device 15 and to make the communication device 15 perform an on-hook/off-hook operation.

Further, if the air-bag switch 13 detects an operation of the air-bag at a time of emergency, or if the communication start switch 13 is operated, the emergency call ECU 11 sets the previously registered phone number as a connection destination and then connects to the emergency call center 5.

The communication device 15 outputs to the emergency call ECU 11 a reception sound signal received from the emergency call center 5 through the network 4 and transmits a transmission sound signal input from the emergency call ECU 11 to the emergency call center 5 through the network 4.

The emergency call ECU 11 outputs the reception sound signal input from the communication device 15 to the speech communication device 20 and outputs a transmission sound signal input from the speech communication device 20 to the communication device 15.

FIG. 3 shows how the speech communication device 20 is installed. The speech communication device 20 is disposed at a ceiling central part 2c between the left sun visor 2a and the right sun visor 2b in a vehicle cabin. The drawing shows an example in which the speech communication device 20 is built into an overhead console 2d at the ceiling central part 2c. In the overhead console 2d is provided a sound passage (air passage) 2e for emitting a reception sound output from the speaker SP of the speech communication device 20 into the vehicle cabin and for causing the microphone M of the speech communication device 20 to collect a sound spoken by an occupant. About how the speech communication device 20 is installed, a more specific description will be given later.

Figure 4B:
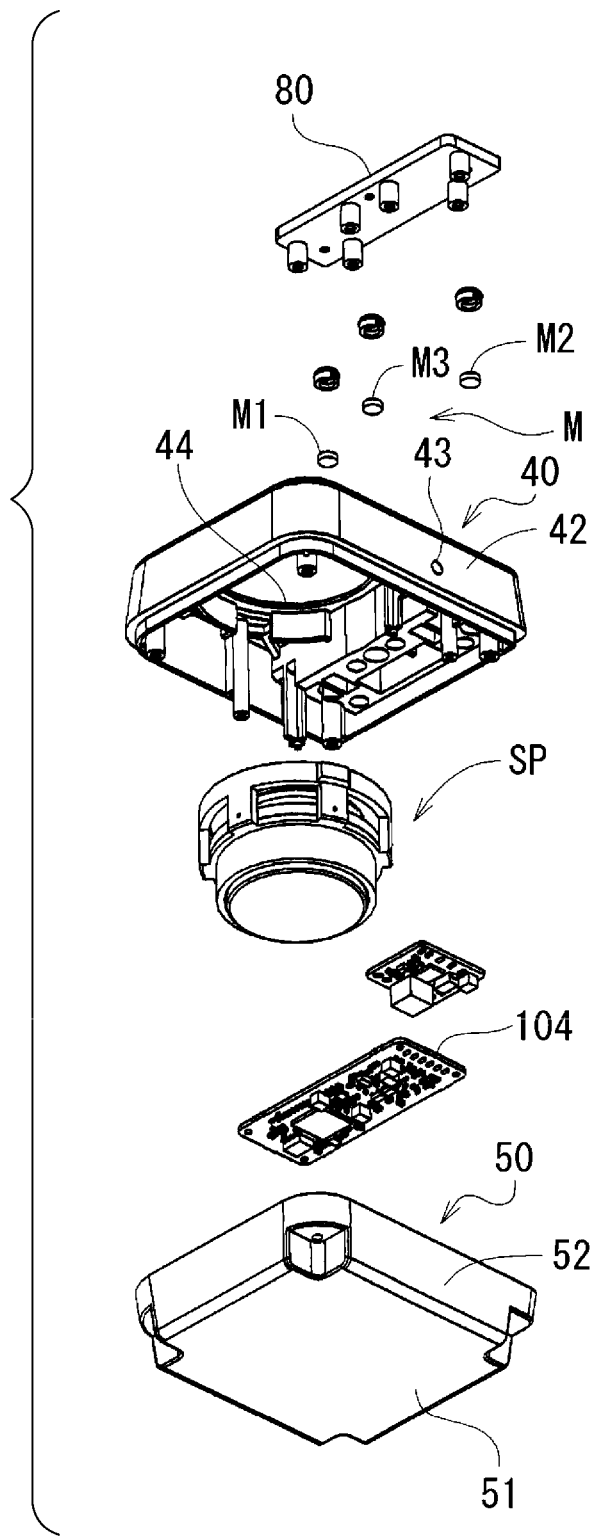
FIG. 4B is an exploded perspective view of the speech communication device, viewed from below with the front surface directed upward.
Figure 5:
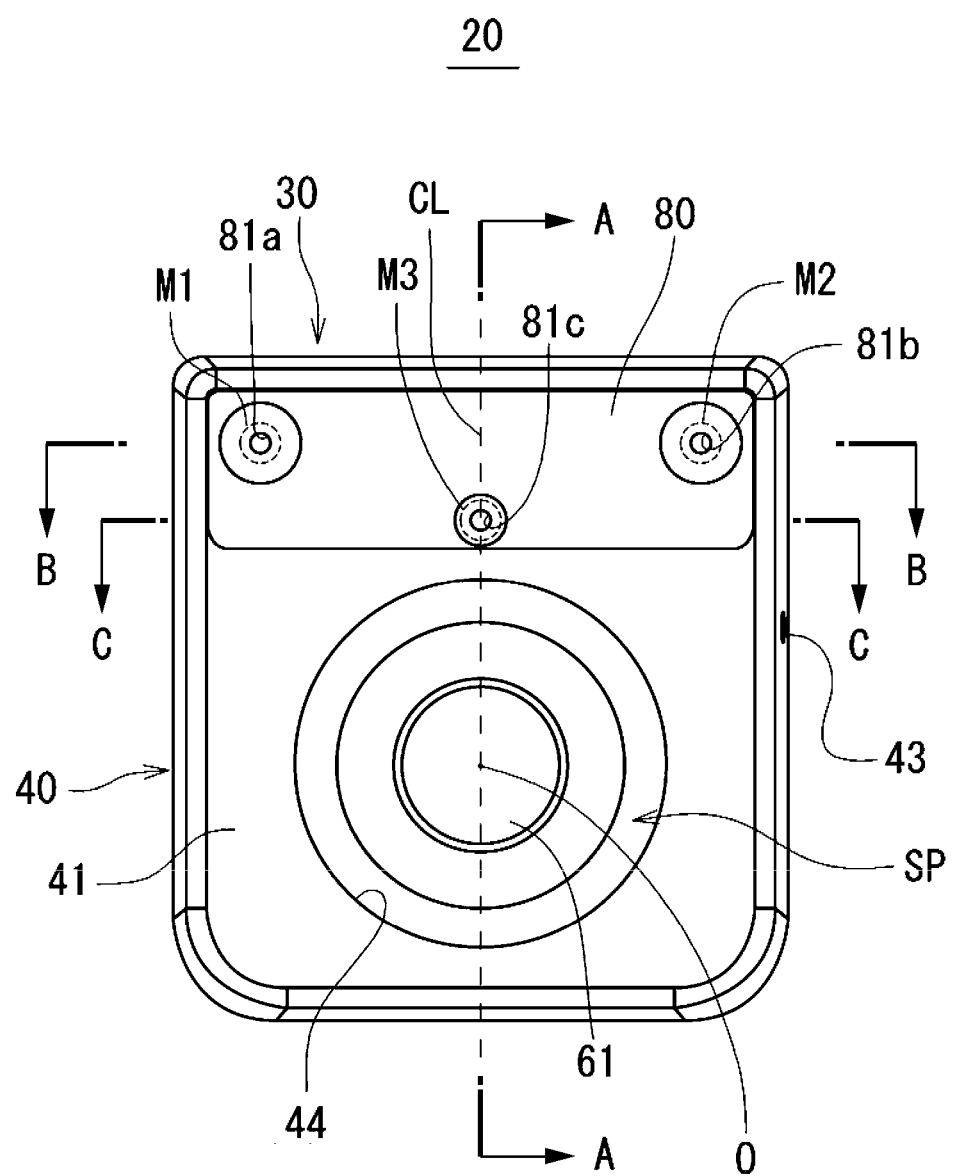
FIG. 5 is a front view of the speech communication device.
Figure 6:
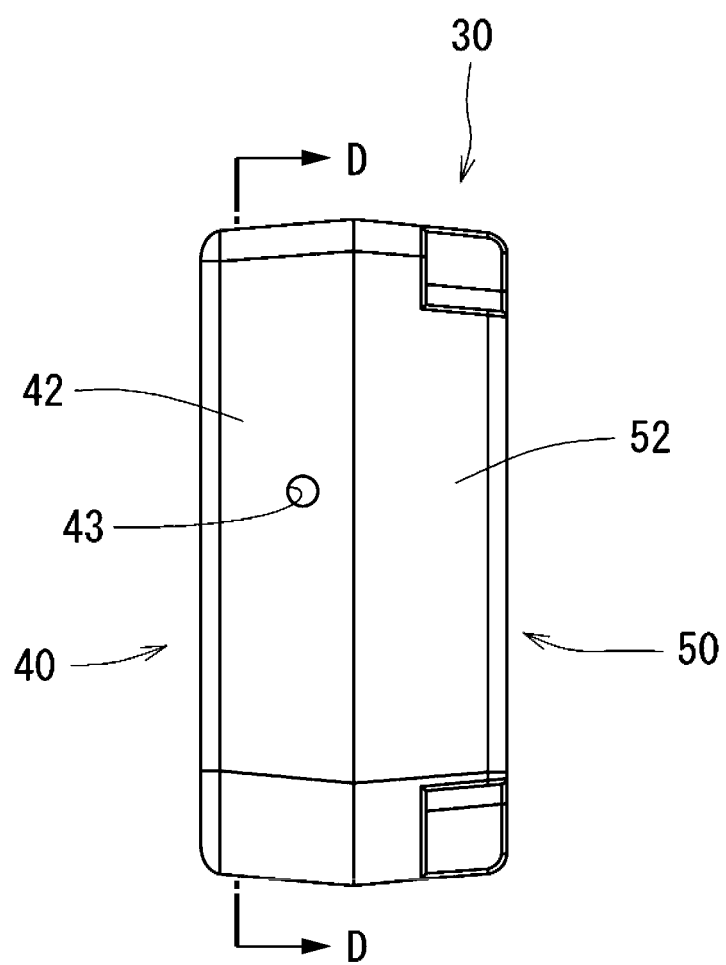
FIG. 6 is a side view of the speech communication device.
Figure 7:
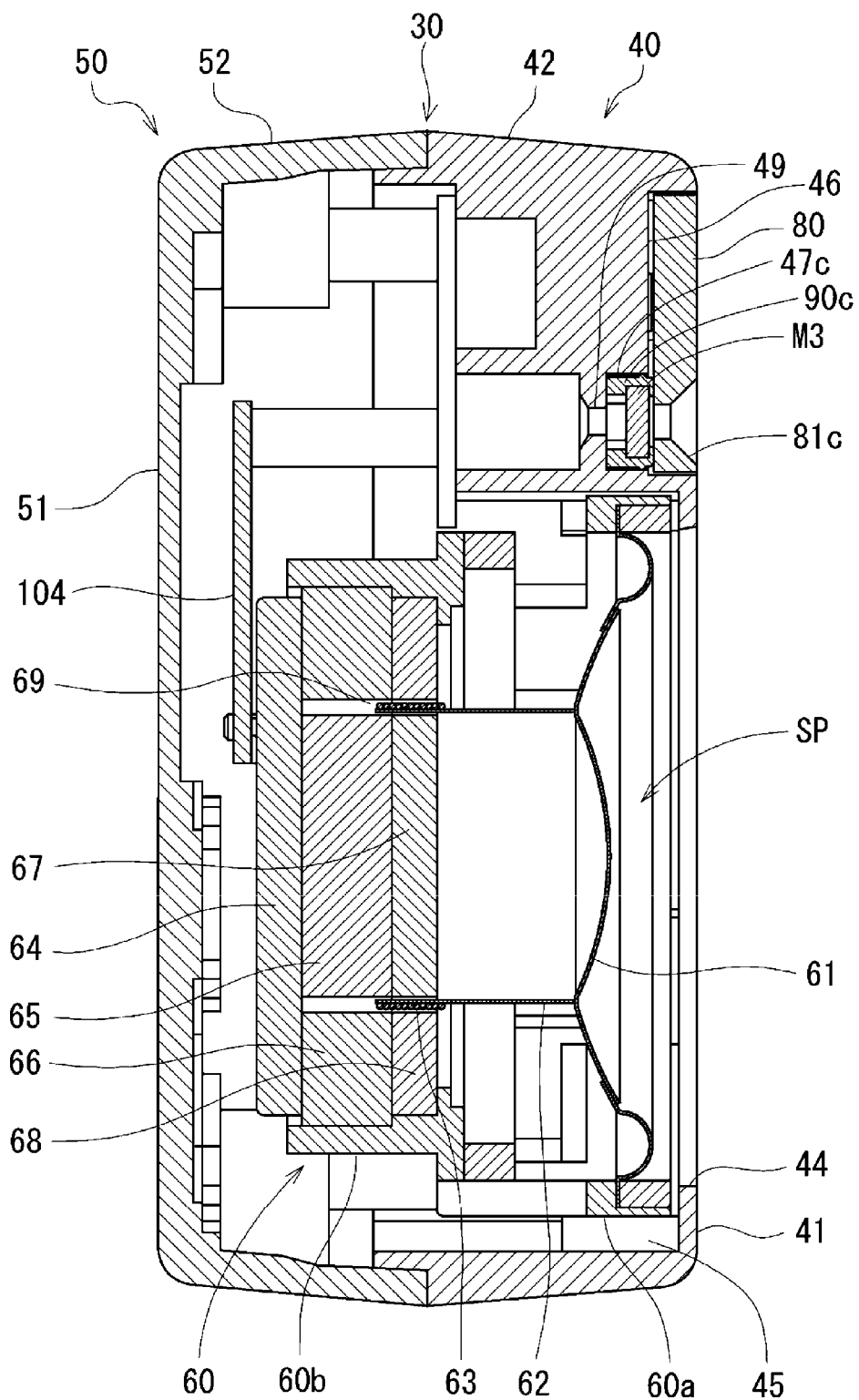
FIG. 7 is a sectional view taken along line A-A in FIG. 5.
Figure 8:
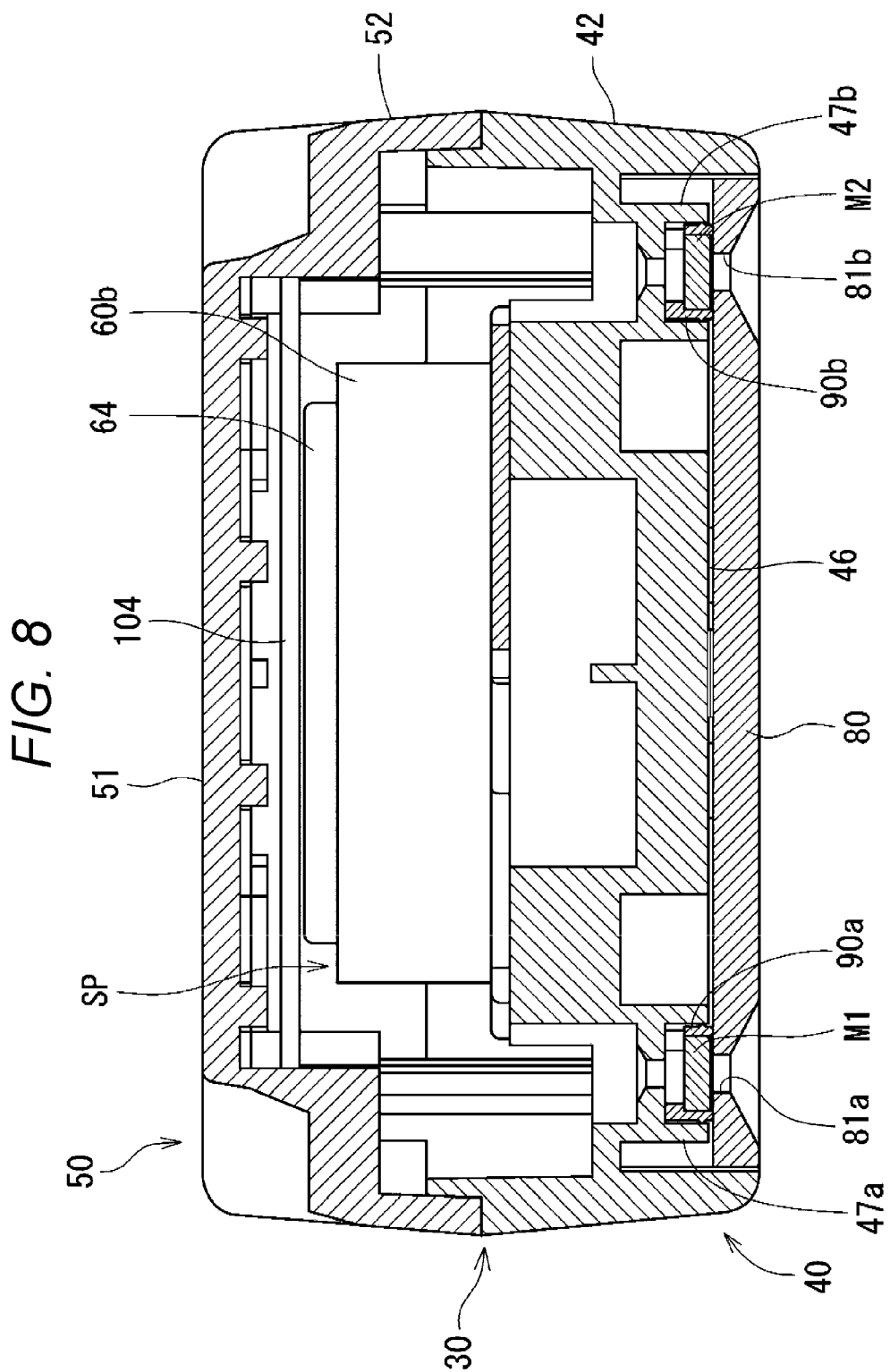
FIG. 8 is a sectional view taken along line B-B in FIG. 5.
Figure 9:
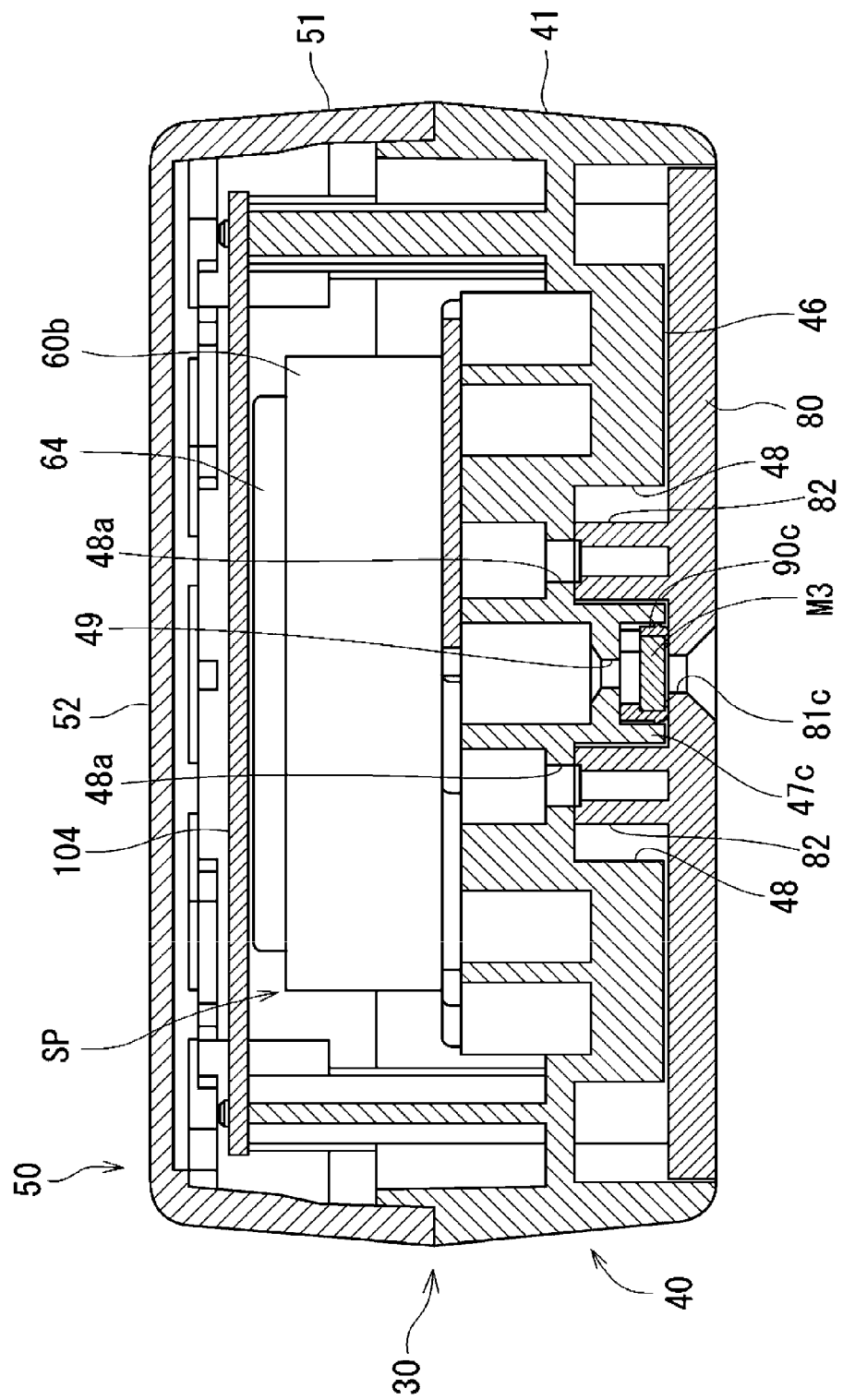
FIG. 9 is a sectional view taken along line C-C in FIG. 5.

FIGS. 4A and 4B show exploded perspective views of the speech communication device 20, FIG. 5 shows a front view of the speech communication device 20, FIG. 6 shows a side view of the speech communication device 20, FIG. 7 shows a sectional view taken along line A-A in FIG. 5, FIG. 8 shows a sectional view taken along line B-B in FIG. 5, and FIG. 9 shows a sectional view taken along line C-C in FIG. 5.

The speech communication device 20 is configured mainly with the housing 30 defining an outline of the speech communication device 20 (a box shape of width 60 mm×height 65 mm×depth 30 mm) and with the speaker SP, the microphone M, and the sound processor 100 housed in the housing 30.

The housing 30 is configured with a front case 40 and a rear case 50. The front case 40 is made by molding insulating synthetic resin material and includes a rectangular front face plate (front surface plate) 41 and a rectangular frame-shaped side wall 42 rising backward (toward the back surface side) from a peripheral edge of the front face plate 41. The rear case 50 is made by molding insulating synthetic resin material and includes a rectangular rear face plate (rear surface plate) 51 and a rectangular frame-shaped side wall 52 rising forward (toward the front surface side) from a peripheral edge of the rear face plate 51. Further, the speaker SP, the microphone M, and the sound processor 100 are mounted on the front case 40, and the front case 40 and the rear case 50 are connected and fixed to make up the housing 30 in the state that a connection cable (not shown) drawn from a printed circuit board 104, on which the sound processor 100 is assembled, is drawn to the outside through a cable leading hole 43 provided in the side wall 42 of the front case 40, in other words, at the end of the assemble process of the speech communication device 20, so that the speech communication device 20 is assembled. The front case 40 and the rear case 50 are fixed by fastening the four corners of each of the two cases with four tapping screws (not shown).

Next, the speaker SP outputs from a front surface of the housing 30 a reception sound of a communication party (an operator at the emergency call center 5) and is mounted, as shown in FIG. 5 and FIG. 7, on the inside of the front face plate 41 of the front case 40 so as to face the front surface of the housing 30, in other words, to face a circular sound emission hole 44 provided in the front case 40.

The speaker SP is equipped, as shown in FIG. 7, with a cylindrical frame 60 in which a cylindrical magnetic circuit holder 60b having a smaller diameter than a vibration system holder 60a is integrally molded on a rear edge of the cylindrical vibration system holder 60a. A vibration system is made up of: a dome-shaped diaphragm 61 with a diameter of 40 mm whose outer circumference edge part is fixed on a front-end opening of the vibration system holder 60a; a cylindrical bobbin 62 fixed on a rear surface of the diaphragm 61; and a voice coil 63 provided on a rear end of the bobbin 62, so that the vibration system can vibrate in a front and back direction. The speaker SP is configured with the vibration system and the magnetic circuit fixed on the magnetic circuit holder 60b by fitting.

The magnetic circuit is configured as an inner and outer magnet type with: a disc-shaped yoke 64; a cylinder-shaped inner permanent magnet 65 fixedly mounted at a central part of a yoke 64; a circular ring-shaped outer permanent magnet 66 fixedly mounted on an outer side of the yoke 64 and disposed to have a predetermined gap on the periphery of the inner permanent magnet 65; a disc-shaped inner polepiece 67 fixedly mounted on the inner permanent magnet 65; and a circular ring-shaped outer polepiece 68 fixedly mounted on the outer permanent magnet 66 and disposed to have a predetermined gap on an periphery of the inner polepiece 67. A magnetic gap 69 is formed between the inner permanent magnet 65 and the outer permanent magnet 66, and the voice coil 63 is disposed in the magnetic gap 69.

Further, the front end of the vibration system holder 60a of the frame 60 is fit in a plurality of arc-shaped ribs 45 for mounting the speaker SP which are protrudingly provided on the periphery of the sound emission hole 44 from an inner surface of the front face plate 41 of the front case 40 and fixed with an adhesive; thus, the speaker SP is mounted on the front case 40 through the frame 60 such that a front face of the diaphragm 61 is opposite to the sound emission hole 44.

Further, a pair of lead wires (not shown) drawn from the voice coil 63 is connected to the printed circuit board 104 on which the sound processor 100 (to be described later) is mounted, and when a reception sound signal is input to the voice coil 63 from the sound processor 100 through the lead wires, an electromagnetic force is generated on the voice coil 63 by a current of the reception sound signal and a magnetic field of the inner and outer permanent magnets 65 and 66; thus, the bobbin 62 is vibrated together with the diaphragm 61 in the front and back direction. At this time, a reception sound depending on the reception sound signal is emitted from the diaphragm 61 to the front of the housing 30 through the sound emission hole 44. That is, an electrodynamic speaker SP is configured.

As described above, the electrodynamic speaker SP is equipped with, as the magnetic circuit, a magnetic circuit of the inner and outer magnet type, and it is thus easy to obtain a high sound pressure level than a magnetic circuit of the inner magnet type or the outer magnet type; therefore, the electrodynamic speaker SP is preferable as the speaker SP which outputs a reception sound of a communication party (an operator at the emergency call center 5) at a time of emergency. However, the magnetic circuit may be of the inner magnet type or the outer magnet type.

Regarding the speaker SP, a center O of the diaphragm 61, which is the center of the speaker SP, is disposed as shown in FIG. 5 at a position on a centerline CL of the width direction of the housing 30 when the speech communication device 20 is viewed from the front side. Further, the sound emission hole 44 is disposed at a coaxial position with the diaphragm 61. In addition, line A-A in FIG. 5 coincides with the centerline CL.

Next, the microphone M collects sounds through the front surface of the housing 30 and is configured with three of first, second, and third omnidirectional microphones M1, M2, and M3 as shown in FIG. 5 and FIGS. 7 to 9. These first, second, and third omnidirectional microphones M1, M2, and M3 (hereinafter, simply referred to as the "microphone M1," the "microphone M2," and the "microphone M3") each have the same configuration.

Figure 10:
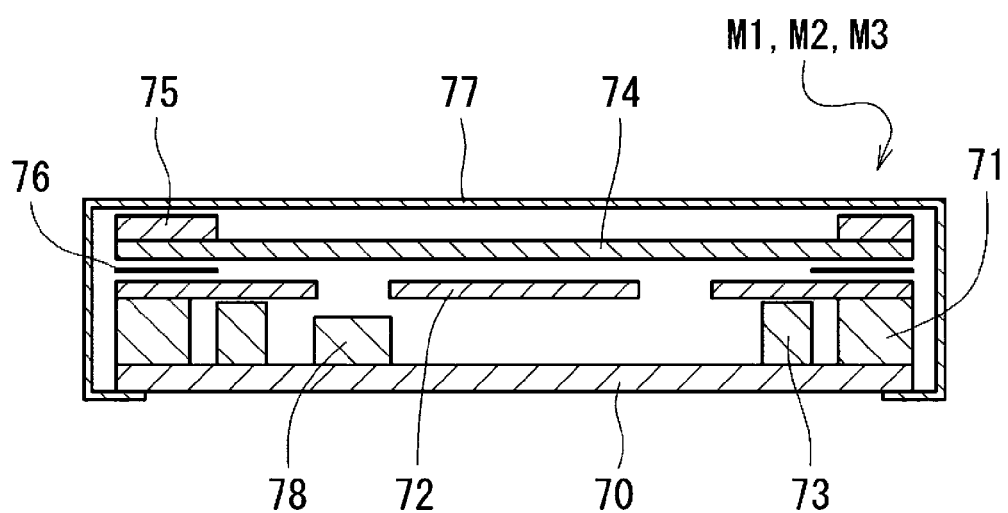
FIG. 10 is a sectional view showing a configuration of first, second, and third omnidirectional microphones.

FIG. 10 shows the configuration of the microphones M1, M2, and M3. Each of the microphones M1, M2, and M3 is configured as an electret condenser microphone of a back electret type with a diameter of 4 mm and the thickness of 1.5 mm. A ring 71 disposed on a printed circuit board 70 supports an electrode 72 made of brass, and a brass ring 73 is provided between the electrode 72 and the printed circuit board 70. Further, a vibration film 74 made of Teflon (registered trade mark) is disposed to face the electrode 72, and a vibration film 74 is supported by a brass ring 75. In an air gap formed between the electrode 72 and the vibration film 74, there is provided a spacer 76. Further, a case 77 above the printed circuit board 70 covers the above respective components, so that an outline of an electret condenser microphone is formed, and an amplified sound signal is output through a junction FET 78 disposed on the printed circuit board 70.

Such microphones M1, M2, and M3 each have a diaphragm 74 disposed in the vicinity of and parallel to the electrode 72, and the electrode 72 is configured with an electret film in which electric charge is enclosed (in other words, charged). Then, when an external acoustic signal vibrates the diaphragm 74 in the two directions each perpendicular to the printed circuit board 70 (the vertical direction in FIG. 10), the distance between the diaphragm 74 and the electrode 72 fluctuates, and the capacitance between the diaphragm 74 and the electrode 72 thus changes depending on the acoustic signal. As a result, by applying a DC voltage between the diaphragm 74 and the electrode 72 through a high resistance, the acoustic signal can be obtained as a fluctuation in voltage. Note that the electrode 72 is made of a metal film such as a brass film or a plastic film to which metal is attached by a vapor deposition process or another process and to which electric charge is injected by a corona discharge process or the like and which has a property to semi-permanently hold the electric charge.

On the front surface of the housing 30 (on an outer surface of the front face plate 41 of the front case 40), there are provided as shown in FIG. 5 and FIGS. 7 to 9: a microphone housing recessed part 46 for housing the microphones M1, M2, and M3, together with the sound emission hole 44 for the speaker SP above the sound emission hole 44; a microphone cover 80 covering the microphone housing recessed part 46; and three of first, second, and third sound collection holes 81a, 81b, and 81c (hereinafter, simply referred to as the "sound collection hole 81a", the "sound collection hole 81b" and the "sound collection hole 81c") formed in the microphone cover 80. The microphone cover 80 is formed by molding insulating synthetic resin material.

In the above arrangement, regarding the microphones M1, M2, and M3, in the microphone housing recessed part 46, the microphones M1 and M2 are disposed at the positions which are axisymmetric with the centerline CL in the width direction of the housing 30 as a symmetric axis, and the microphone M3 is disposed on the symmetric axis at a position which is closer to the speaker SP than the microphones M1 and M2 are. Here, the centerline CL in the width direction of the housing 30 corresponds to a line segment extending in the radial direction from the center O of the diaphragm 61 of the speaker SP.

Figure 11:
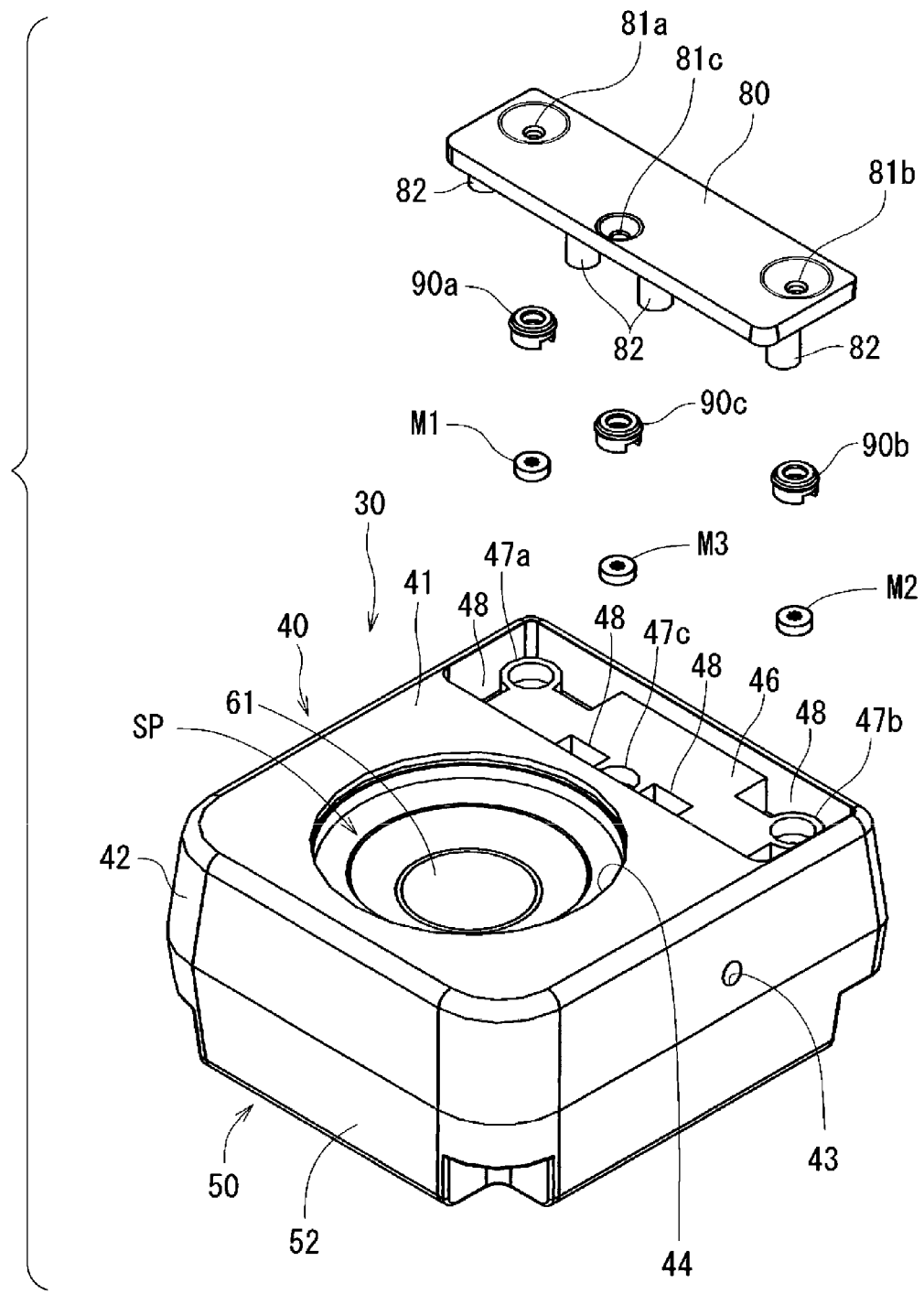
FIG. 11 is an exploded perspective view showing a structure for housing the microphone when a front surface of the speech communication device is directed upward.
Figure 12:
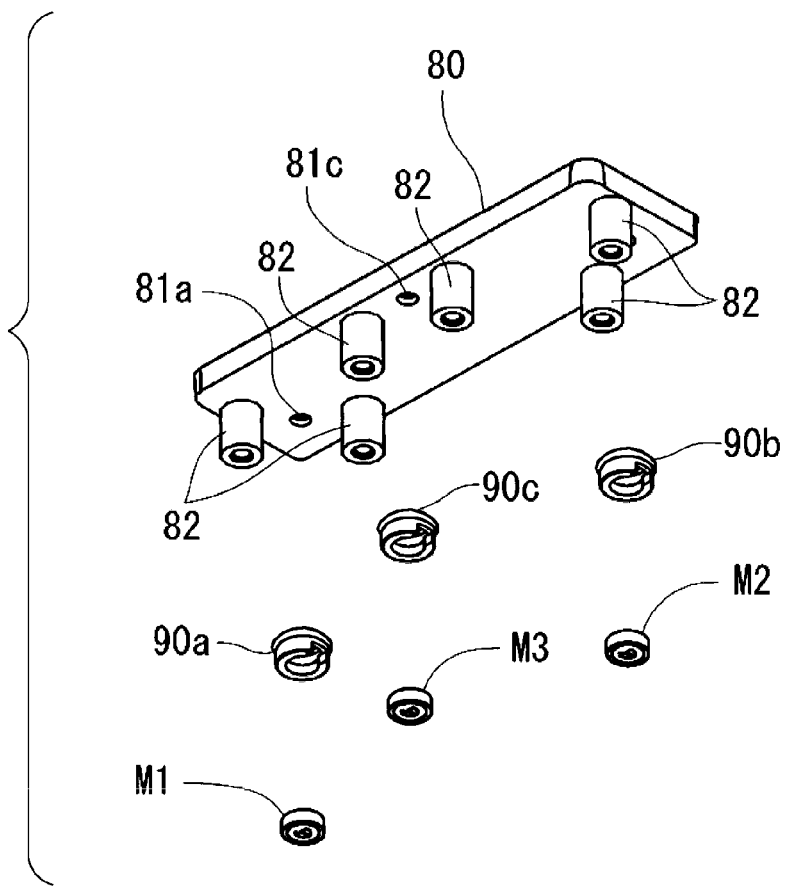
FIG. 12 is a perspective view, viewed from below, of a microphone cover, microphone holders, and the microphones which are exploded in FIG. 11.
Figure 13A:
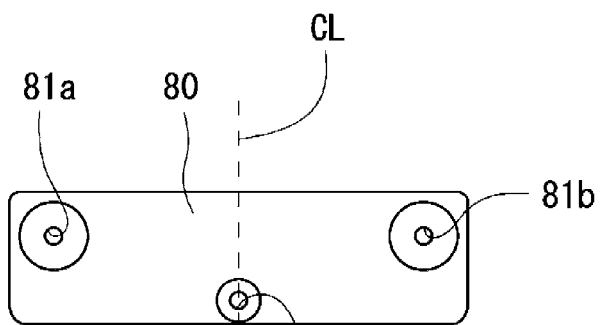
FIGS. 13A to 13C are exploded front views showing a structure for housing the microphones.
Figure 13B:
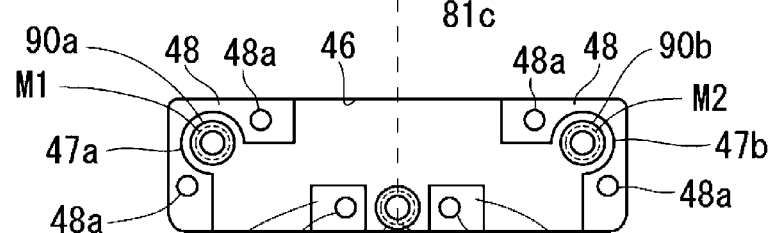
Figure 13C:
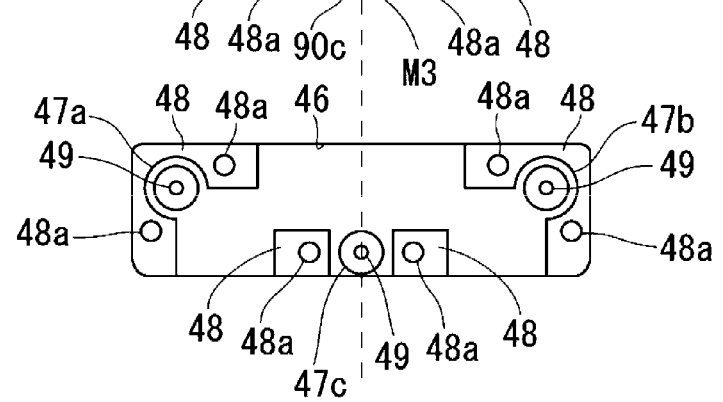

FIG. 11 is an exploded perspective view showing a structure for housing the microphones M1, M2, and M3 when the front surface of the speech communication device 20 is directed upward, FIG. 12 shows an exploded perspective view, viewed from below, of the microphone cover 80, the microphone holders 90a, 90b, and 90c, and the microphones M1, M2, and M3. FIGS. 13A to 13C are front views showing a structure for housing the microphones M1, M2, and M3, FIG. 13A shows a front view of the microphone housing recessed part 46 (a front view of the microphone cover), FIG. 13B shows a front view of the microphone housing recessed part 46 when the microphone cover 80 in FIG. 13A is drawn transparent, and FIG. 13C shows a front view of the microphone housing recessed part 46 when the microphone holders 90a, 90b, and 90c and the microphones M1, M2, and M3 in FIG. 13B are drawn transparent.

The microphone housing recessed part 46 is formed, above the sound emission hole 44 in the front surface of the housing 30, in a rectangular recessed part such that the microphone cover 80 formed in a rectangular plate-shape is closely fit therein; and in the bottom of the rectangular recessed part, there are provided: three of first, second, and third microphone housing parts 47a, 47b, and 47c (hereinafter, simply referred to as the "microphone housing part 47a," the "microphone housing part 47b," and the "microphone housing part 47c") each constituted by a circular-shaped recessed part for housing each of the microphones M1, M2, and M3; and a plurality of recessed parts 48 into which a plurality of boss parts 82 protrudingly provided from the inner surface of the microphone cover 80 for screw fixing are to be inserted. In the bottoms of the microphone housing parts 47a, 47b, and 47c, there are provided three of first, second, and third lead wire holes 49a, 49b, and 49c (hereinafter, simply referred to as the "lead wire hole 49a," the "lead wire hole 49b," and the "lead wire hole 49c") for drawing lead wires (not shown) led from the printed circuit boards 70 of the microphones M1, M2, and M3 into the inner surface side of the housing 30 (the inner surface side of the front face plate 41 of the front case 40); and on the bottom surfaces of the recessed parts 48, there are provided bolt insertion holes 48a.

Here, the microphones M1, M2, and M3 are housed in the microphone housing parts 47a, 47b, and 47c in such postures that the diaphragms 74 of the microphones M1, M2, and M3 vibrate in the same direction as the vibration direction of the diaphragm 61 of the speaker SP (the front and back direction) and that sound collection surfaces of the microphones M1, M2, and M3 are provided to face the same direction as the sound direction output from the speaker SP (the forward direction).

Then, after the microphones M1, M2, and M3 are put into the microphone housing parts 47a, 47b, and 47c in the microphone housing recessed part 46 from the front surface side of the housing 30 (from ahead of the front face plate 41 of the front case 40), the microphone cover 80 is fit into the microphone housing recessed part 46 from the front surface side of the housing 30 to fix the microphone cover 80 on the housing 30; thus, the microphones M1, M2, and M3 are disposed to be held in the microphone housing recessed part 46 at the above-described positions and in the above-described postures while the microphones M1, M2, and M3 are pressed by the inner surface of the microphone cover 80 and while the sound collection holes 81a, 81b, and 81c are opposite to the sound collection surfaces of the microphones M1, M2, and M3. The microphone cover 80 is fixed by screwing in tapping screws (not shown) from behind the front face plate 41 of the front case 40 through each of the bolt insertion holes 48a into each of the boss parts 82 of the microphone cover 80.

Further, there are provided three of the first, second, and third cylindrical microphone holders 90a, 90b, and 90c, which are made of a resilient rubber material (elastomer) and are housed in the microphone housing parts 47a, 47b, and 47c together with the microphones M1, M2, and M3 while being fit on the outer circumferences on the microphones M1, M2, and M3 and being held between the outer circumferential surfaces of the microphones M1, M2, and M3 and the microphone housing parts 47a, 47b, and 47c; thus, the microphone holders 90a, 90b, and 90c can absorb and reduce the vibration transferred from the speaker SP to the microphones M1, M2, and M3 through the housing 30.

FIGS. 14A and 14B are diagram each showing an inner surface of the housing 30, FIG. 14A is a rear view of the front case 40, and FIG. 14B is a front view of the rear case 50. Further, FIG. 15 shows a sectional view taken along line D-D in FIG. 6.

Figure 15:
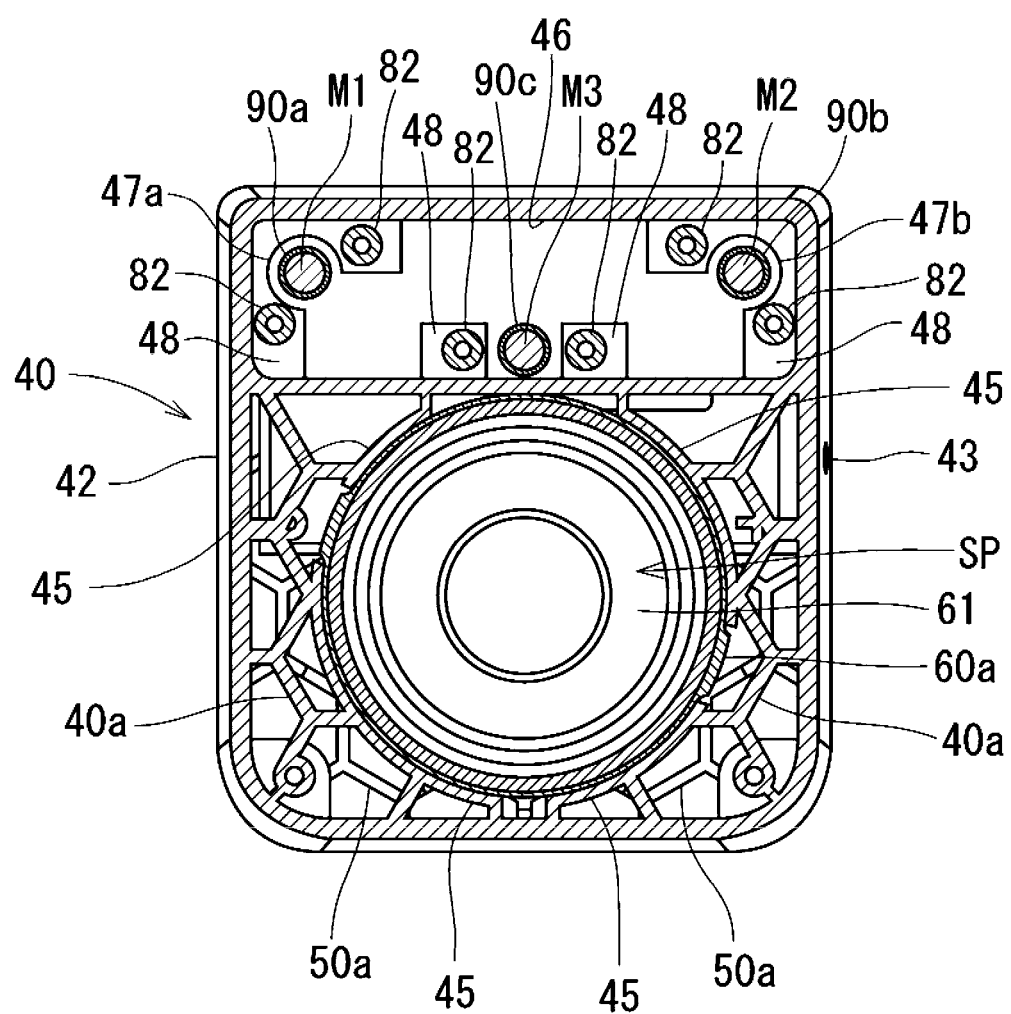
FIG. 15 is a sectional view taken along line D-D in FIG. 6.

On the inner surface of the front face plate 41 of the front case 40 and on the periphery of the arc-shaped ribs 45 for mounting the speaker, there are provided honeycomb reinforcement ribs 40a as shown in FIG. 14A and FIG. 15; and also on the inner surface of the rear face plate 51 of the rear case 50, there are provided honeycomb reinforcement ribs 50a. The reinforcement ribs 40a and 50a increase stiffness of the housing 30, and it is thus possible to reduce the vibration transferred from the speaker SP to the microphones M1, M2, and M3 through the housing 30.

Figure 16:
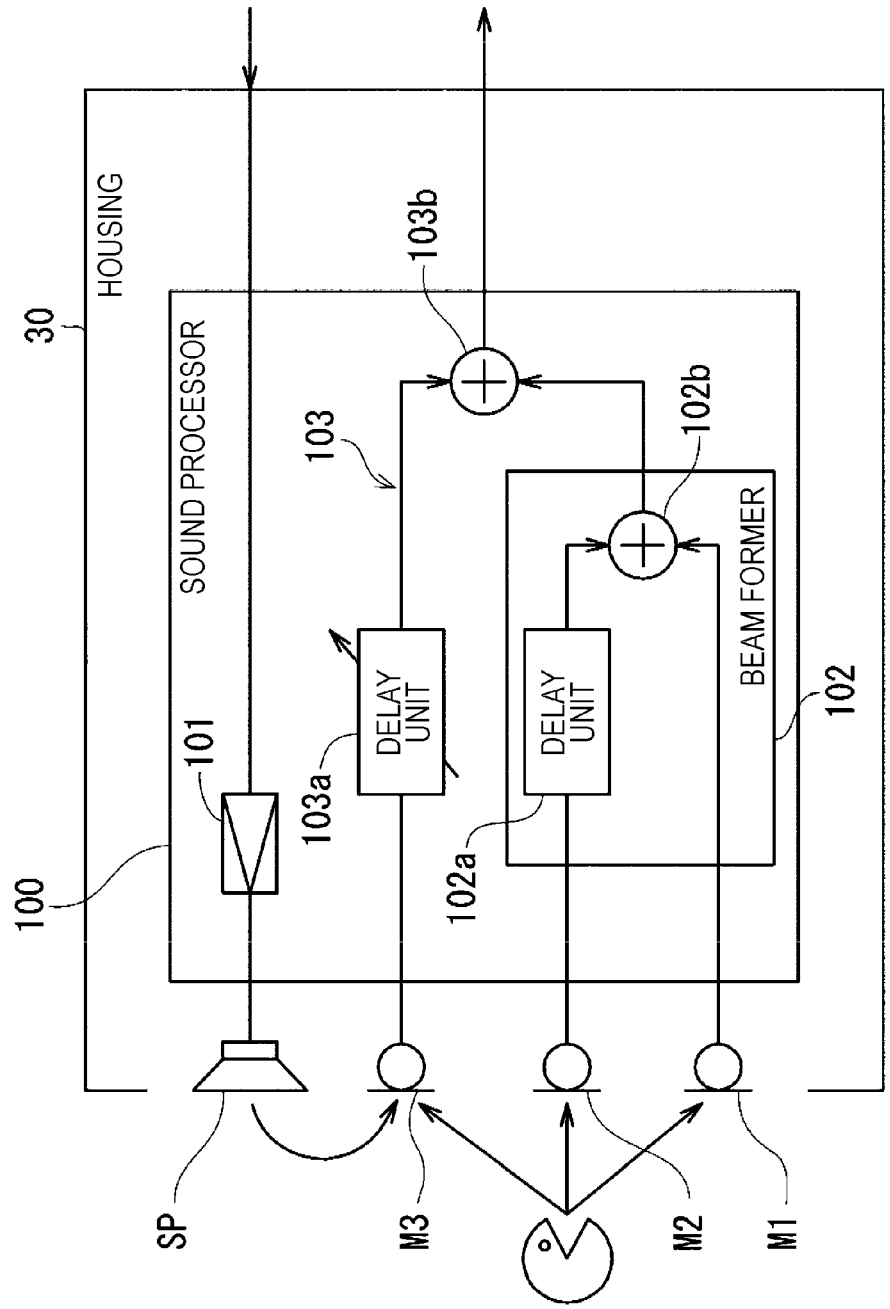
FIG. 16 is a circuit configuration diagram of a sound processor.

FIG. 16 shows a circuit configuration diagram of the sound processor 100. The sound processor 100 is configured with an IC equipped with an amplifier 101, the beam former 102, and an echo cancel unit 103, and a reception sound signal received by the communication device 15 and input through the emergency call ECU 11 is amplified by the amplifier 101 and is then output from the speaker SP. Further, sound signals input from the microphones M1, M2, and M3 are subjected to signal processing (to be described later) on the beam former 102 and the echo cancel unit 103 and are then output to the communication device 15 through the emergency call ECU 11, thereby being transmitted to the emergency call center 5.

Figure 17:
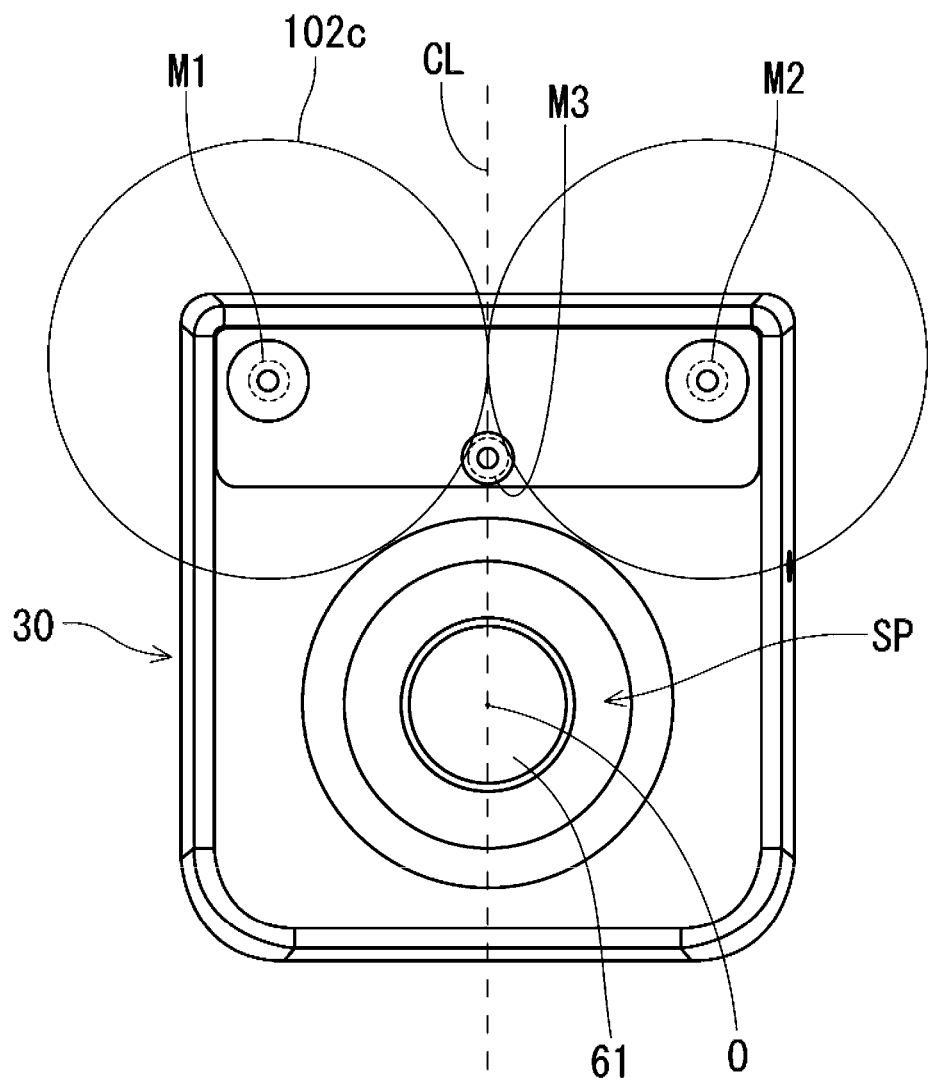
FIG. 17 is a front view showing directionalities of the microphones.

The beam former 102 is connected to the microphones M1 and M2 and is equipped with: a delay unit 102a which delays the output from one microphone M2 by the time period corresponding to the distance X (43 mm in the present embodiment) between the centers of the sound collection surfaces of the microphone M1 and M2; and an accumulator 102b which adds the output from the delay unit 102a to the output from the other microphone M1; thus, as shown in FIG. 17, the beam former 102 forms a bidirectionality 102c in which the directionality is strong in the two directions perpendicular to the centerline CL in the width direction of the housing 30 (the width direction of the housing 30 and the right and left direction in the arrangement direction of the microphone M1 and M2) and the directionality is weak in the two directions along the centerline CL in the width direction of the housing 30 (the height direction of the housing 30 and the vertical direction in the arrangement direction of the speaker SP and the microphone M). Note that the distance from the center O of the diaphragm 61 of the speaker SP to an intersection point between a straight line connecting the centers of the sound collection surfaces of the microphones M1 and M2 and the centerline CL in the width direction of the housing 30 is 31.5 mm.

The echo cancel unit 103 is connected to the microphone M3 and the accumulator 102b and is equipped with: a delay unit 103a which delays an output of the microphone M3 by the time period corresponding to the difference (Y−Y3) between (i) the respective distances Y1 and Y2 (Y1=Y2=Y) from the centers of the sound collection surfaces of the microphones M1 and M2 to the center O of the diaphragm 61 of the speaker SP and (ii) the distance Y3 (24 mm in the present embodiment) from the center of the sound collection surface of the microphone M3 to the center O of the diaphragm 61 of the speaker SP; and an accumulator 103b which adds an output from the delay unit 103a to an output of the accumulator 102b of the beam former 102, so that a sound signal output from the microphone M3 is removed from a sound signal output from the beam former 102. That is, a sound signal (residual echo) from the speaker SP contained in the output from the beam former 102 is removed.

The sound processor 100 is housed in the housing 30, being mounted on the printed circuit board 104. The printed circuit board 104 is mounted on the front case 40 and is housed in a gap between a rear end of the speaker SP in the housing 30 and the rear face plate 51 of a rear case 50, as shown in FIGS. 7 to 9.

Then, as shown in FIG. 3, in the overhead console 2d disposed at the ceiling central part 2c between the left sun visor 2a and the right sun visor 2b in the vehicle cabin, the speech communication device 20 is disposed in the following manner; the front surface of the housing 30 (the outer surface of the front face plate 41 of the front case 40) is directed downward to face a sound passing part 2e right under the front surface of the housing 30; the microphone M is located behind the speaker SP with the front side surface and the rear side surface of the housing 30 being directed in the front and back direction of the vehicle 2; and the centerline CL in the width direction of the housing 30 extends in the front and back direction of the vehicle 2.

As described above, a speech communication device 20 of the present embodiment includes: a housing 30 disposed in a vehicle cabin; a speaker SP which is housed in the housing 30 and outputs from a front surface of the housing 30 a reception sound of a communication party; and a microphone M which is housed in the housing 30 and collects sounds from the front surface of the housing 30. The microphone M is constituted by: first and second microphones M1 and M2 disposed at positions which are axisymmetric with a centerline CL in the width direction of the housing 30 as a symmetric axis; and a third microphone M3 disposed at a position which is on the centerline CL and is closer to the speaker SP than the first and second microphones M1 and M2 are. The speech communication device 20 further includes a sound processor 100 which includes: a beam former 102 which is connected to the first and second microphones M1 and M2 and forms a bidirectionality 102c in which directionality is strong in two directions each perpendicular to the centerline CL and is weak in two directions each along the centerline CL; and an echo cancel unit 103 which is connected to the beam former 102 and the third microphone M3 and removes a sound signal having been output from the third microphone M3 from a sound signal having been output from the beam former 102.

Thus, the sound processor 100 causes the beam former 102 connected to the first and second microphones M1 and M2 to form the bidirectionality 102c in which directionality is strong in the two directions each perpendicular to the centerline CL and is weak in the two direction each along the centerline CL, in other words, the sound processor 100 weakens the directionality of the microphone M1 and M2 in the direction toward the speaker SP; therefore, it is possible to reduce an echo coming into the microphones M1 and M2 from the speaker SP. Further, the sound processor 100 causes the echo cancel unit 103 connected to the beam former 102 and the third microphone M3 to remove the sound signal having been output from the third microphone M3 from the sound signal having been output from the beam former 102; therefore, it is possible to extract only a voice generated by an occupant with high quality.

Therefore, it is possible to achieve a hands-free speech communication device for an emergency call system of a speaker and microphone integrated type in which a speaker SP and a microphone M are housed in the same housing 30 while reducing the influence of the speaker SP to the microphone M.

Further, the housing 30 is disposed at a ceiling central part 2c between a left sun visor 2a and a right sun visor 2b in the vehicle cabin such that the front surface of the housing 30 is directed downward, the microphone M is located behind the speaker SP, and the centerline CL extends in the front and back direction of the vehicle 2. With this arrangement, the directionality is weakened in the front and back direction viewed from the ceiling central part 2c between the left sun visor 2a and the right sun visor 2b in the vehicle cabin and is strengthened in the right and left direction; therefore, it is possible to collect voices of the occupants behind the wheel and in the passenger's seat.

Further, on the front surface of the housing 30, there are provided: a sound emission hole 44 provided at a position facing the diaphragm 61 of the speaker SP; a microphone housing recessed part 46 which houses the microphone M; a microphone cover 80 which covers the microphone housing recessed part 46; and sound collection holes 81a, 81b, and 81c provided in the microphone cover 80. This arrangement enables the microphone M to be put into the microphone housing recessed part 46 from the front surface side of the housing 30; therefore, it is easy to assemble.

Further, in the microphone housing recessed part 46, there are provided microphone housing parts 47a, 47b, and 47c each of which separately houses each of the microphones M1, M2, and M3. This arrangement enable the microphones M1, M2, and M3 to be easily positioned.

Further, there are provided microphone holders 90a, 90b, and 90c, which are made of a resilient rubber material and are respectively housed, together with the microphones M1, M2, and M3, in the first, second, and third microphone housing parts 47a, 47b, and 47c such that the microphone holders 90a, 90b, and 90c are respectively held between outer circumferential surfaces of the microphones M1, M2, and M3 and inner peripheral surfaces of the first, second, and third microphone housing parts 47a, 47b, and 47c while being fit on outer circumferences of the microphones M1, M2, and M3. With this arrangement, it is possible to reduce the vibration transferred from the speaker SP to the microphones M1, M2, and M3 through the housing 30 by means of the microphone holders 90a, 90b, and 90c.

In addition, with reference to second to fourth embodiments, there will be described below other structures which are for reducing the vibration transferred from the speaker SP to the microphones M1, M2, and M3 through the housing 30.

Second Embodiment

Figure 18:
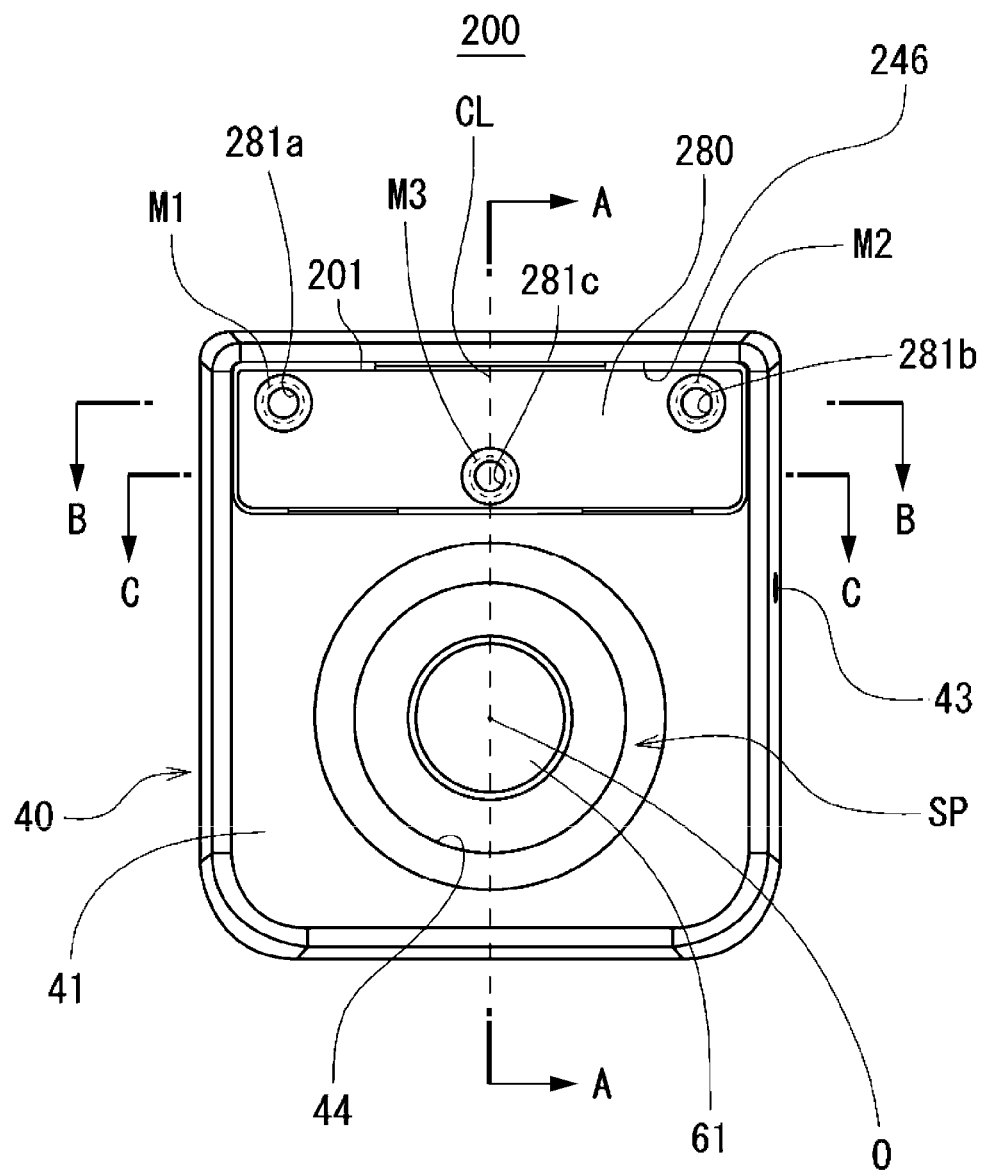
FIG. 18 is a front view of a speech communication device of a second embodiment.
Figure 19:
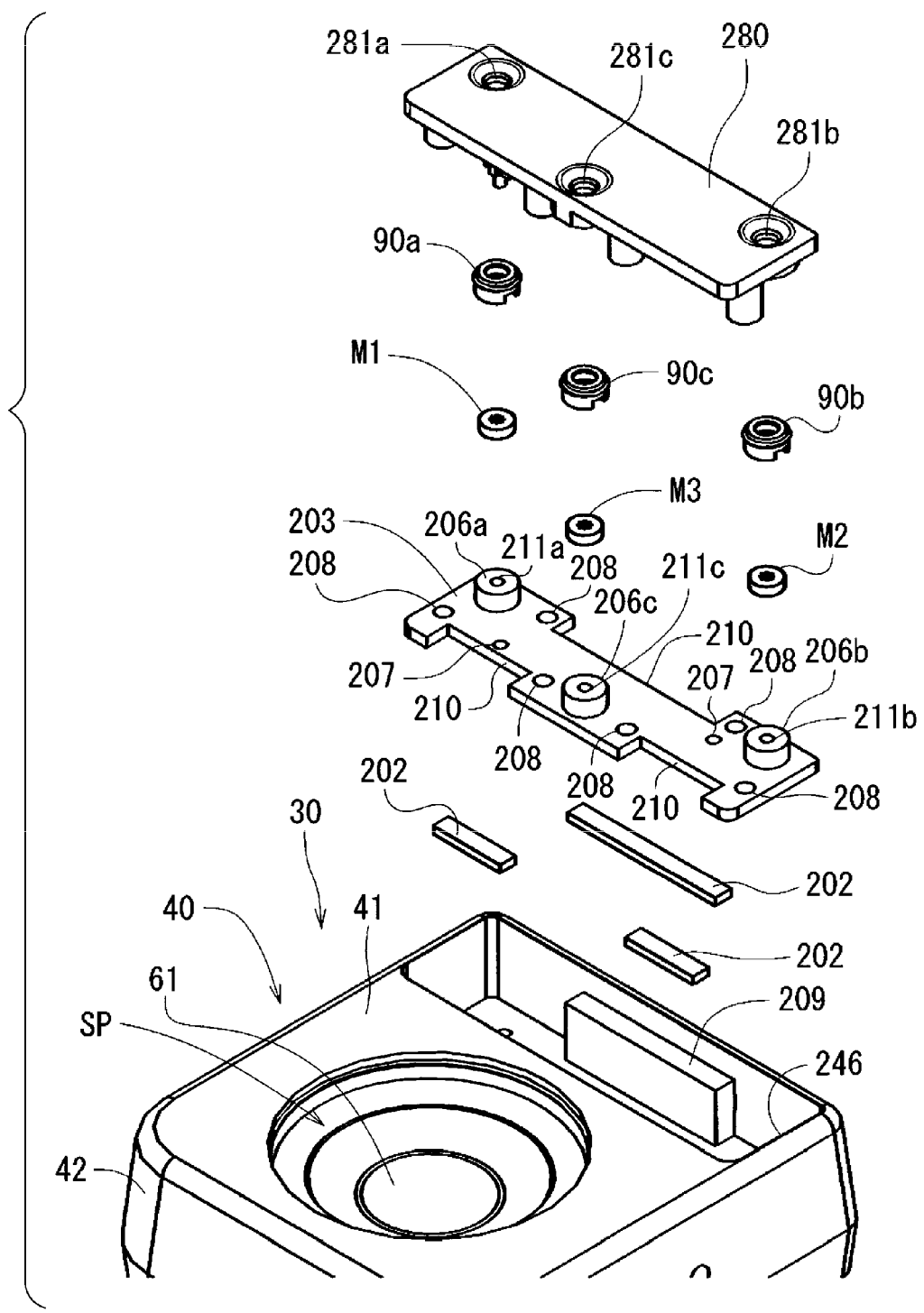
FIG. 19 is an exploded perspective view showing a structure for housing microphones when a front surface of the speech communication device is directed upward.
Figure 21A:
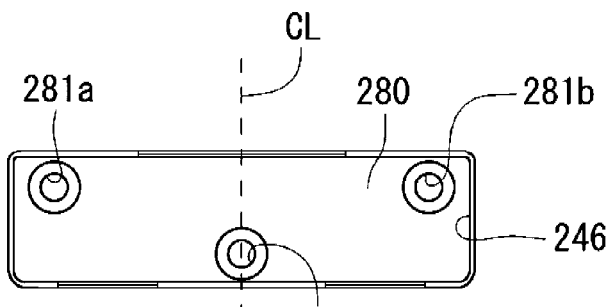
FIGS. 21A to 21D are exploded front views showing a structure for housing the microphones.
Figure 21B:
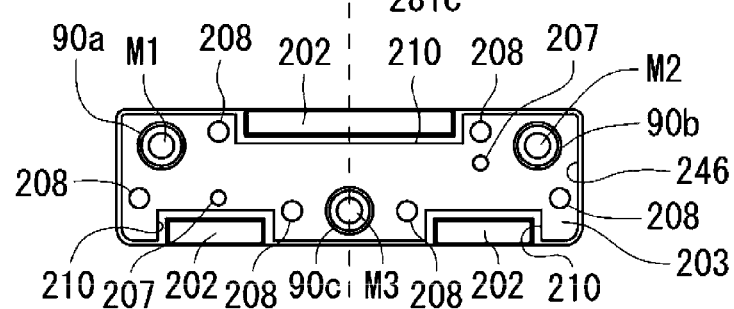
Figure 21C:
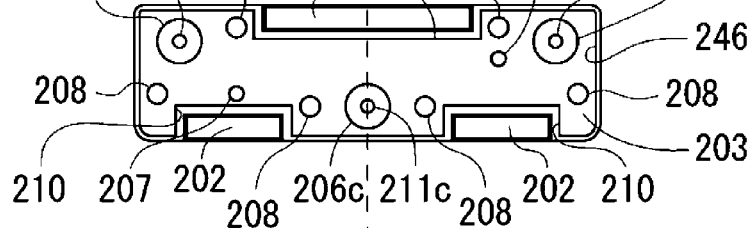
Figure 21D:
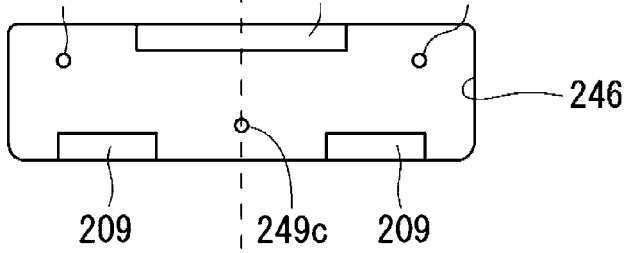
Figure 22:
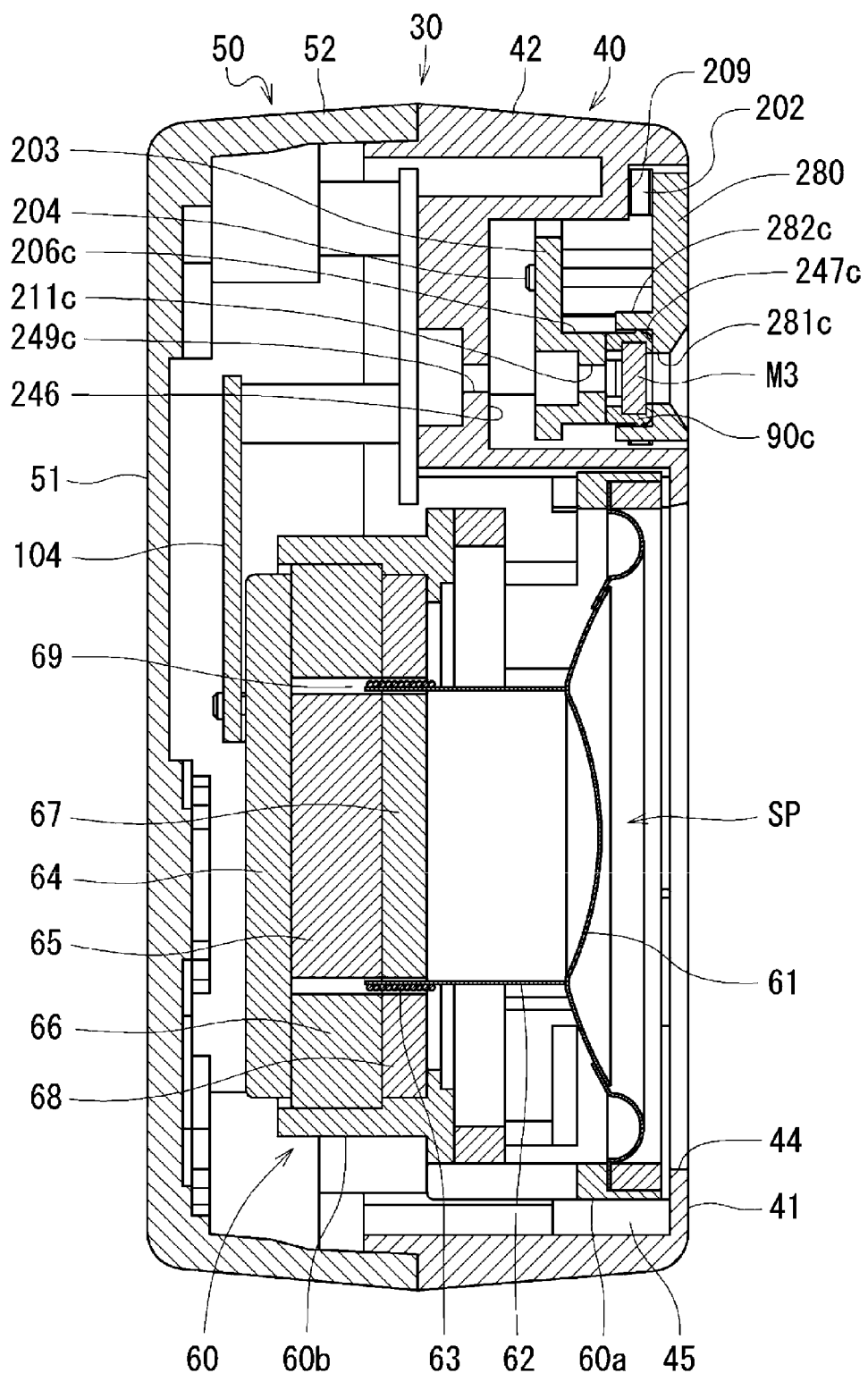
FIG. 22 is a sectional view taken along line A-A in FIG. 18.
Figure 23:
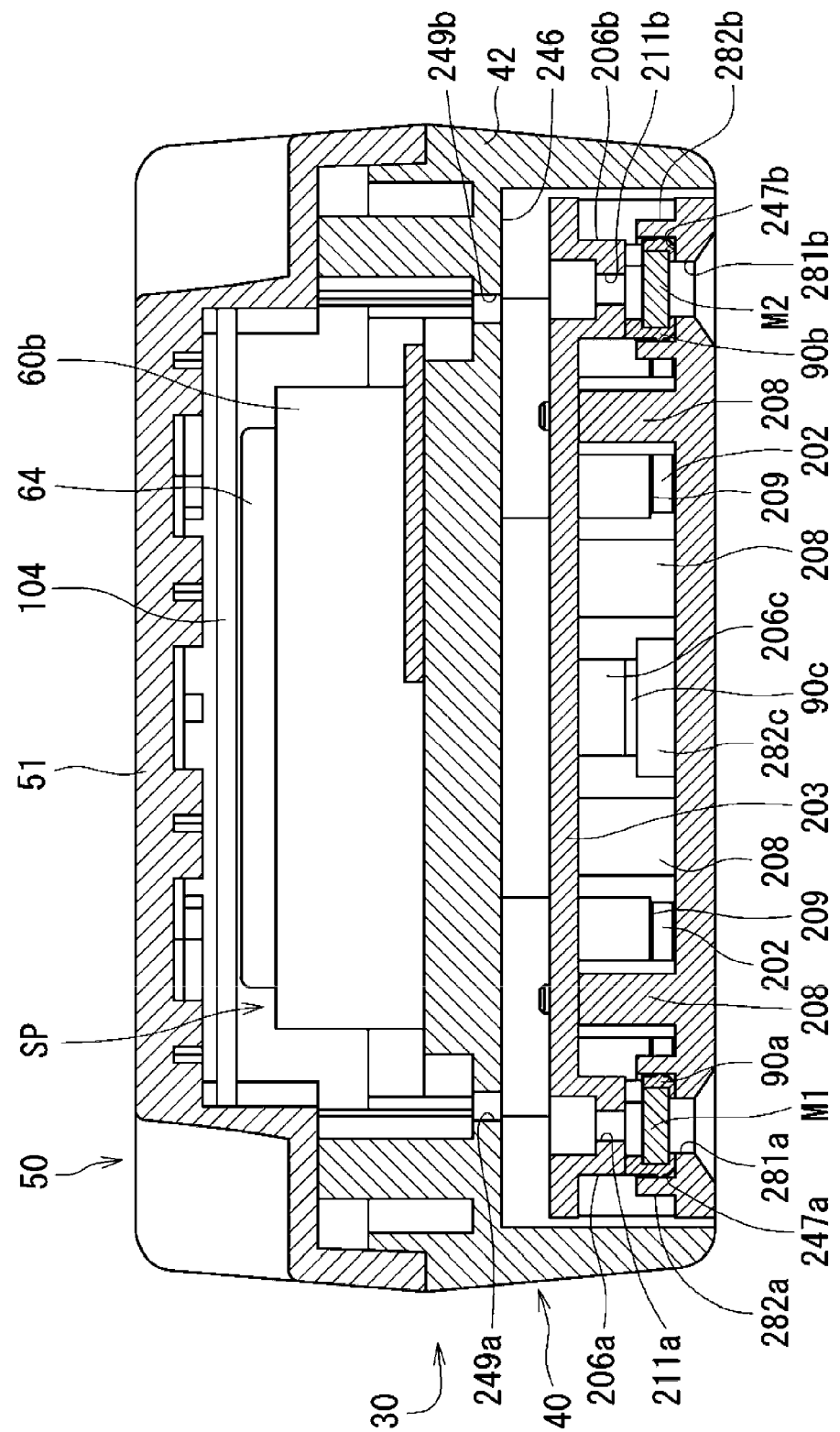
FIG. 23 is a sectional view taken along line B-B in FIG. 18.
Figure 24:
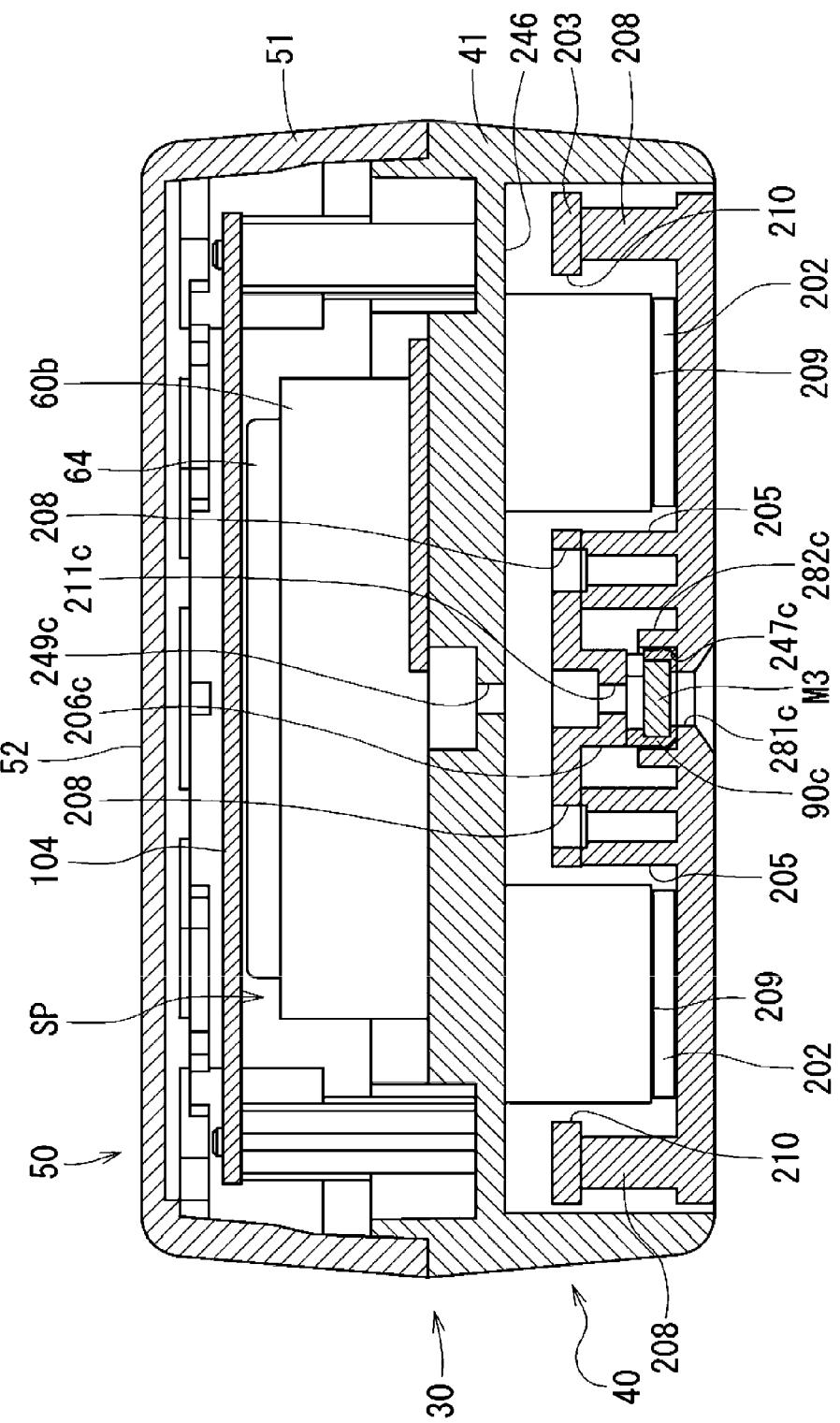
FIG. 24 is a sectional view taken along line C-C in FIG. 18.
Figure 25:
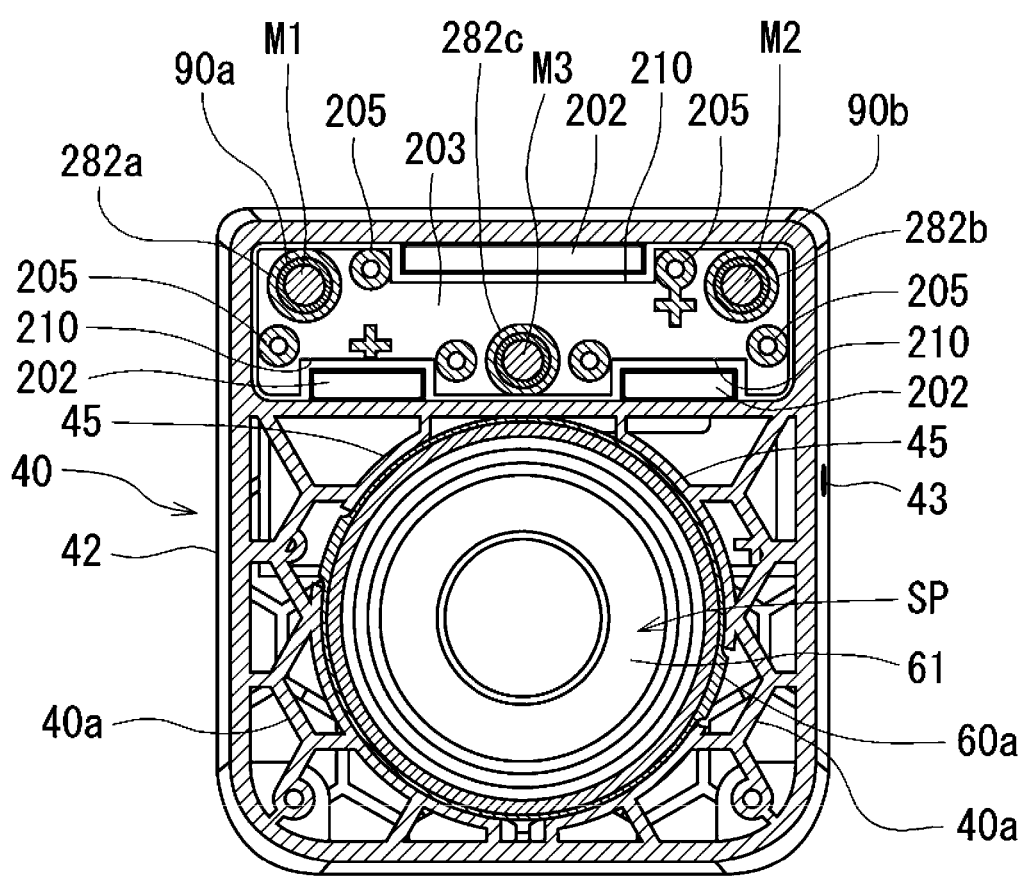
FIG. 25 is a sectional view corresponding to FIG. 15 of the first embodiment.

FIG. 18 shows a front view of a speech communication device 200 of a second embodiment. FIG. 19 shows an exploded perspective view showing a structure for housing microphones M1, M2, and M3 when a front surface of the speech communication device 200 is directed upward. FIG. 20 shows an exploded perspective view, viewed from below, of a microphone cover 280, microphone holders 90a, 90b, and 90c, the microphones M1, M2, and M3, a fixing plate 203, and cushion members 202 in FIG. 19. FIGS. 21A to 21D show exploded front views showing a structure for housing the microphones M1, M2, and M3, FIG. 21A shows a front view of a microphone housing recessed part 246 (a front view of the microphone cover 280), FIG. 21B shows a front view of the microphone housing recessed part 246 when the microphone cover 280 in FIG. 21A is drawn transparent, FIG. 21C shows a front view of the microphone housing recessed part 246 when the microphone holders 90a, 90b, and 90c and the microphones M1, M2, and M3 in FIG. 21B are drawn transparent, and FIG. 21D shows a front view of the microphone housing recessed part 246 when the fixing plate 203 and the cushion members 202 in FIG. 21C are drawn transparent. FIG. 22 shows a sectional view taken along line A-A in FIG. 18, FIG. 23 shows a sectional view taken along line B-B in FIG. 18, and FIG. 24 shows a sectional view taken along line C-C in FIG. 18. A side view of the speech communication device 200 is identical to the side view shown in FIG. 6 of the first embodiment. FIG. 25 is a sectional view corresponding to FIG. 15 (the sectional view taken along line D-D in FIG. 6) of the first embodiment.

In the hands-free speech communication device (hereinafter, referred to as a "speech communication device") 200 for an emergency call system of a speaker and microphone integrated type in which a speaker SP and a microphone M are housed in the same housing 30, the microphone cover 280 is formed in a rectangular shape a little smaller than the shape of an opening of the microphone housing recessed part 246 so that a gap 201 will be created around the microphone cover 280 so as to prevent the microphone cover 280 from being in contact with the housing 30 when the microphone cover 280 is put in the microphone housing recessed part 246. Further, the microphones M1, M2, and M3 are attached to the microphone cover 280, and the microphone cover 280 is fixed on the microphone housing recessed part 246 with cushion members 202 each of which has adhesiveness on the both sides. With this arrangement, the vibration transferred from the speaker SP to the microphones M1, M2, and M3 through the housing 30 is reduced by means of the cushion members 202.

Further, the microphones M1, M2, and M3 are attached to the microphone cover 280 in such a manner that the microphones M1, M2, and M3 are held between the microphone cover 280 and the fixing plate 203 which is provided on the back surface side of the microphone cover 280 and is to be fixed thereon with a predetermined distance therebetween. The fixing plate 203 is formed by molding insulating synthetic resin material.

On an inner surface of the microphone cover 280, at the three positions corresponding to three of first, second, and third sound collection holes 281a, 281b, and 281c (hereinafter, simply referred to as the "sound collection hole 281a," the "sound collection hole 281b," and the "sound collection hole 281c") provided in the microphone cover 280, there are protrudingly provided three of first, second, and third cylindrical boss parts 282a, 282b, and 282c (hereinafter, simply referred to as the "boss part 282a," the "boss part 282b," and the "boss part 282c"); and in rear end faces of the boss parts 282a, 282b, and 282c, in the axis direction, there are provided three of first, second, and third microphone housing parts 247a, 247b, and 247c (hereinafter, simply referred to as the "microphone housing part 247a," the "microphone housing part 247b," and the "microphone housing part 247c") which are constituted by circular recessed parts. Further, on the inner surface of the microphone cover 280, there are provided a plurality of positioning pins 204 and a plurality of boss parts 205 for screw fixing.

On the other hand, on a front surface of the fixing plate 203 facing the inner surface of the microphone cover 280, at three positions facing the microphone housing parts 247a, 247b, and 247c, there are protrudingly provided three of first, second, and third microphone pressing parts 206a, 206b, and 206c (hereinafter, simply referred to as the "microphone pressing part 206a," the "microphone pressing part 206b," and the "microphone pressing part 206c") which are constituted by projecting parts. Further, in the fixing plate 203, there are provided a plurality of positioning holes 207 corresponding to the positioning pins 204 and a plurality of bolt insertion holes 208 corresponding to the boss parts 205 for screw fixing.

Then, the microphones M1, M2, and M3 are housed in the microphone housing parts 247a, 247b, and 247c of the microphone cover 280, and the fixing plate 203 is then parallely fixed on the back surface side of the microphone cover 280 with a predetermined distance therebetween; thus, the microphones M1, M2, and M3 are pressed by the end faces of the microphone pressing parts 206a, 206b, and 206c of the fixing plate 203 and are held in the microphone housing parts 247a, 247b, and 247c of the microphone cover 280 such that the sound collection surfaces of the microphones M1, M2, and M3 are opposite to the sound collection holes 281a, 281b, and 281c of the microphone cover 280. Here, the microphones M1, M2, and M3 are housed in the microphone housing parts 247a, 247b, and 247c of the microphone cover 280 with the microphone holders 90a, 90b, and 90c being fit on the outer circumferences of the microphones M1, M2, and M3. Further, the fixing plate 203 is fixed on the microphone cover 280 by screwing in tapping screws (not shown) from the back surface side of the fixing plate 203 through the bolt insertion holes 208 into the boss parts 205 of the microphone cover 280 while the positioning pins 204 of the microphone cover 280 are positioned being fit in the positioning holes 207 of the fixing plate 203.

Further, after attaching the microphones M1, M2, and M3 to the microphone cover 280, the microphone cover 280 is put into the microphone housing recessed part 246 from the front surface side of the housing 30 (from ahead of the front face plate 41 of the front case 40) so as to fix the microphone cover 80 on the housing 30; thus, the microphones M1, M2, and M3 are disposed to be housed in the microphone housing recessed part 46 of the housing 30 at the same position and in the same posture as in the first embodiment.

There are protrudingly provided cover abutting parts 209 on three positions which include a position on an upper central part and two positions on lower both end parts on a peripheral wall part of the microphone housing recessed part 246, and the cover abutting parts 209 are provided to have a constant width to support the microphone cover 280 at the opening of the microphone housing recessed part 246 so that, when the microphone cover 280 is put into the microphone housing recessed part 246, an outer peripheral part of the inner surface of the microphone cover 280 will be in contact with the cover abutting parts 209 and the outer surface of the microphone cover 280 is flush with the front surface of the housing 30. Front end surfaces of the cover abutting parts 209 are stuck with the cushion members 202 each having a tape-like shape with a constant width and adhesiveness on the both sides. The cushion members 202 are formed by, for example, sticking two-sided adhesive tapes on or applying adhesive to both sides of a tape-like spongy base material with a constant width so as to form adhesive layers.

Then, after attaching the microphones M1, M2, and M3 to the microphone cover 280, the microphone cover 280 is put into the microphone housing recessed part 246 from the front surface side of the housing 30; thus, the outer peripheral part of the inner surface of the microphone cover 280 is adhered to the cushion members 202. Because the microphone cover 280 is fixed on the microphone housing recessed part 246 with the cushion members 202 and because the microphone cover 280 is not directly in contact with the housing 30, the vibration transferred from the speaker SP to the microphones M1, M2, and M3 through the housing 30 is reduced.

Further, the fixing plate 203 is formed in the same rectangular shape as the microphone cover 280 so that the fixing plate 203 will not be in contact with the housing 30 when put in the microphone housing recessed part 246 together with the microphone cover 280. Further, in the outer edge part of the microphone cover 280, there are provided notch parts 210 so as to prevent the microphone cover 280 from interfering (being in contact) with the cover abutting part 209.

Further, in the microphone pressing parts 206a, 206b, and 206c of the fixing plate 203, there are provided three of first, second, and third lead wire holes 211a, 211b, and 211c (hereinafter, simply referred to as the "lead wire hole 211a," the "lead wire hole 211b," and the "lead wire hole 211c") through which lead wires of the microphones M1, M2, and M3 are drawn out to a bottom part of the microphone housing recessed part 246 of the back surface side of the fixing plate 203; and in a bottom surface of the microphone housing recessed part 246 facing the back surface of the fixing plate 203, there are provided three of first, second, and third lead wire holes 249a, 249b, and 249c to face the lead wire holes 211a, 211b, and 211c so that the lead wires of the microphones M1, M2, and M3 can be drawn into the inner surface side (the inner surface side of the front face plate 41 of the front case 40) of the housing 30.

As described above, in the speech communication device 200 of the present embodiment, the microphone housing parts 247a, 247b, and 247c are provided on the microphone cover 280 so as to separately house the microphones M1, M2, and M3 such that the microphone housing parts 247a, 247b, and 247c protrude from the inner surface of the microphone cover 280, the cushion members 202 are provided to have adhesiveness on the both sides so as to fix the microphone cover 280 on the microphone housing recessed part 246, and the gap 201 is provided between the microphone housing recessed part 246 and the microphone cover 280. With this arrangement, it is possible to reduce the vibration transferred from the speaker SP to the microphones M1, M2, and M3 through the housing 30 by means of the cushion members 202.

Third Embodiment

Figure 26:
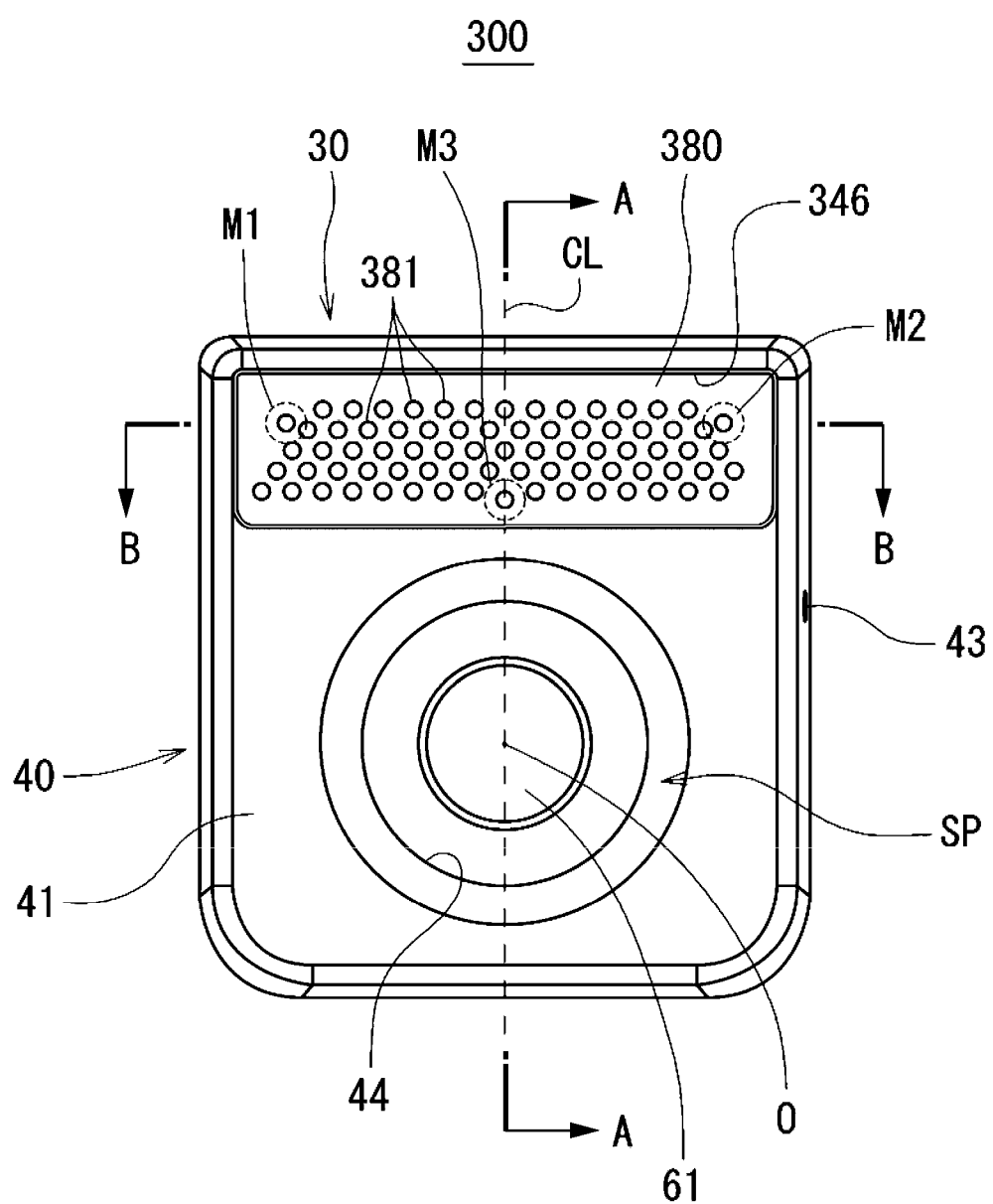
FIG. 26 is a front view of a speech communication device of a third embodiment.
Figure 27:
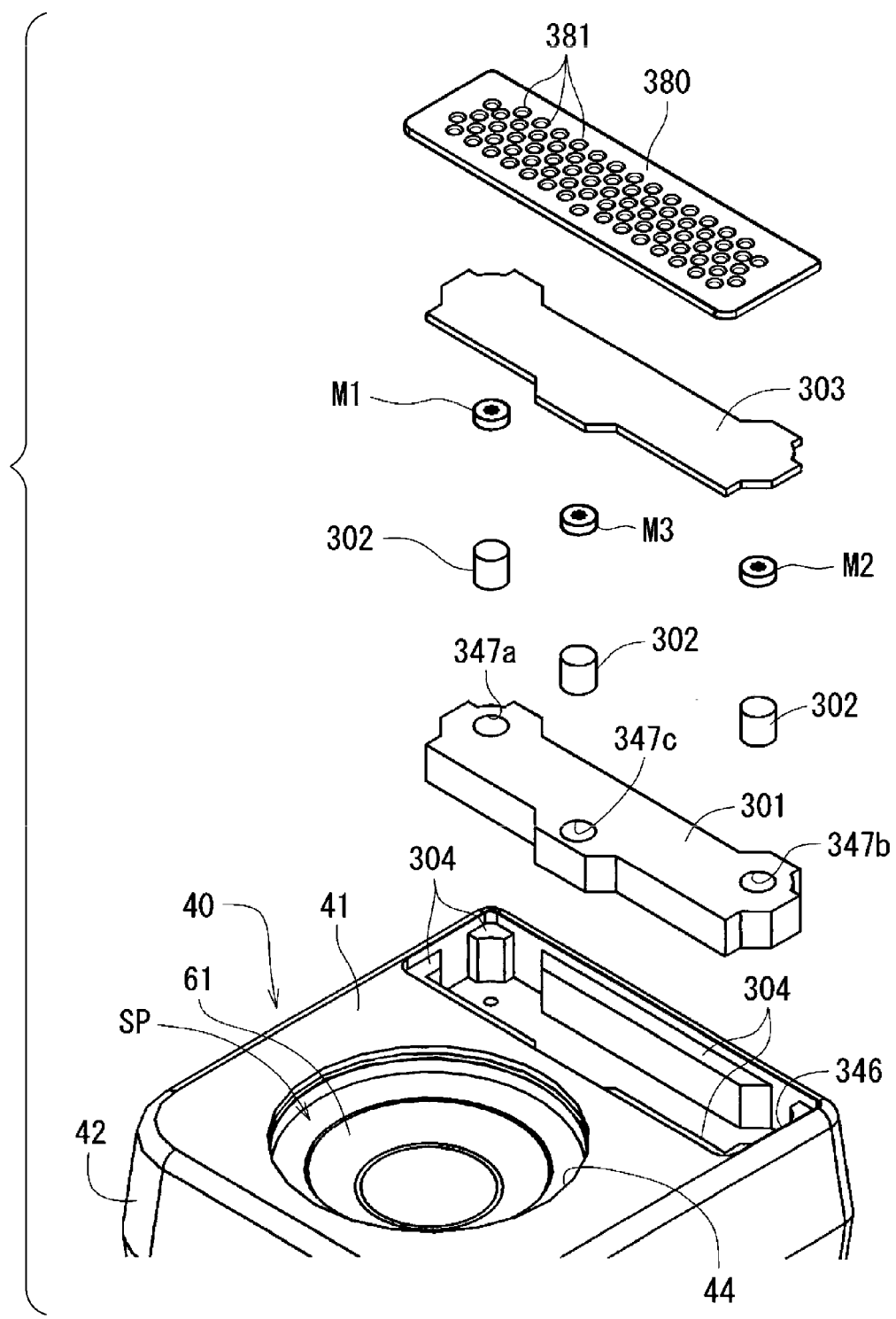
FIG. 27 is an exploded perspective view showing a structure for housing microphones when a front surface of the speech communication device is directed upward.
Figure 28A:
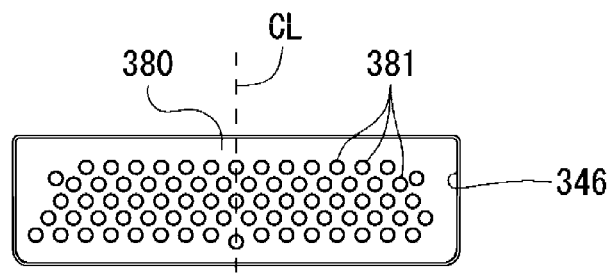
FIGS. 28A to 28D are exploded front views showing the structure for housing the microphones.
Figure 28B:
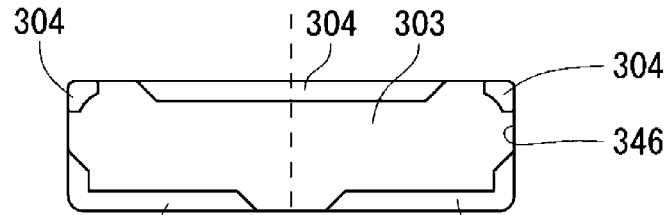
Figure 28C:
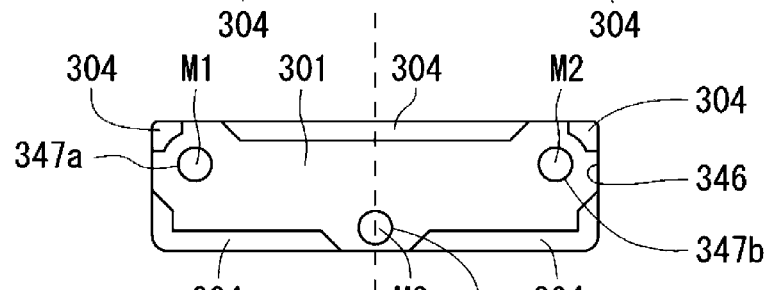
Figure 28D:
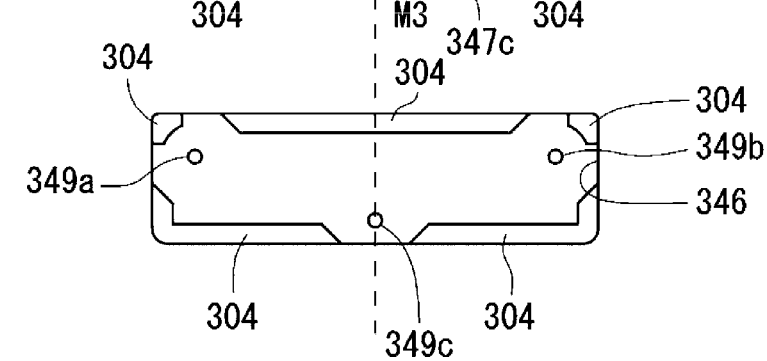
Figure 29:
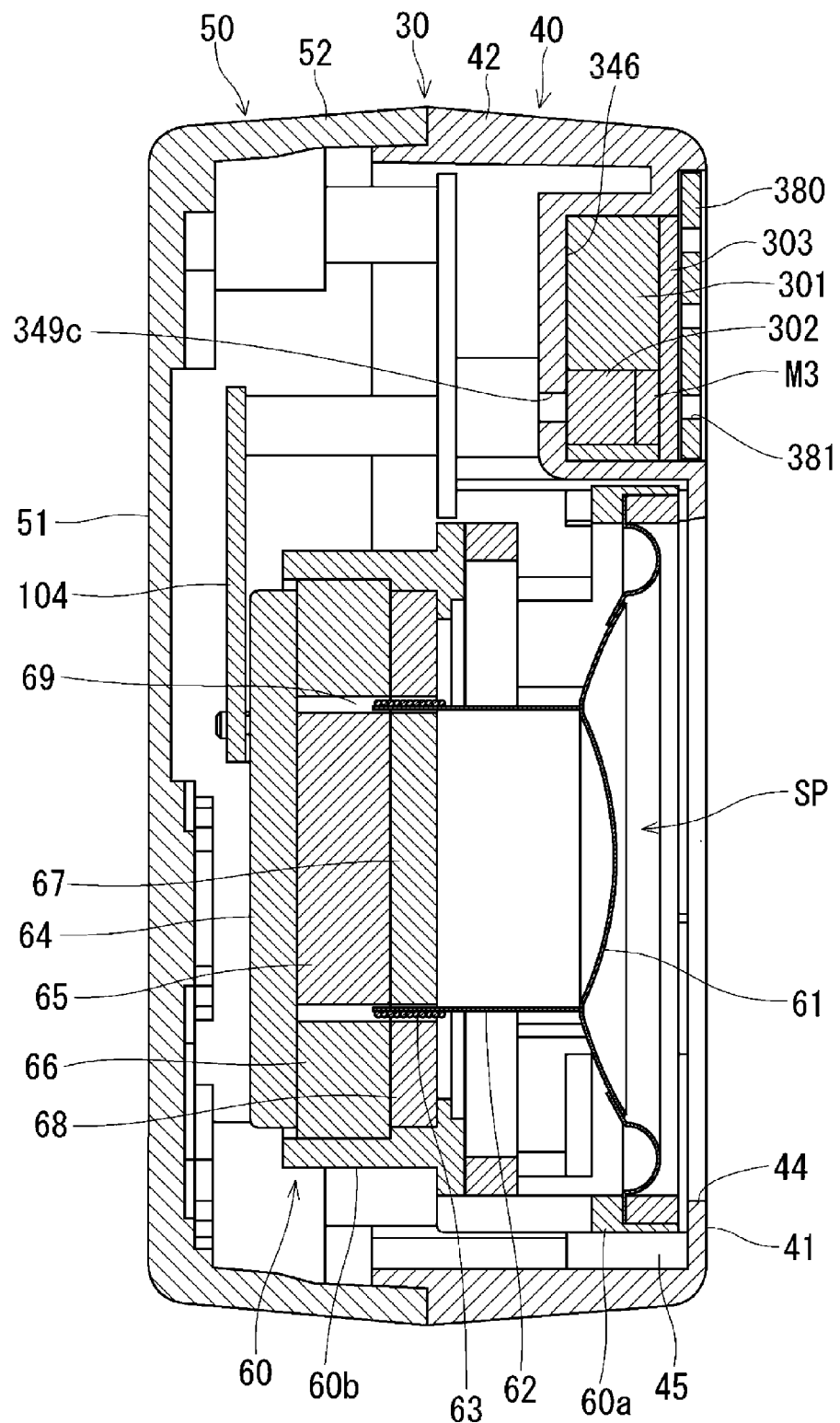
FIG. 29 is a sectional view taken along line A-A in FIG. 26.
Figure 30:
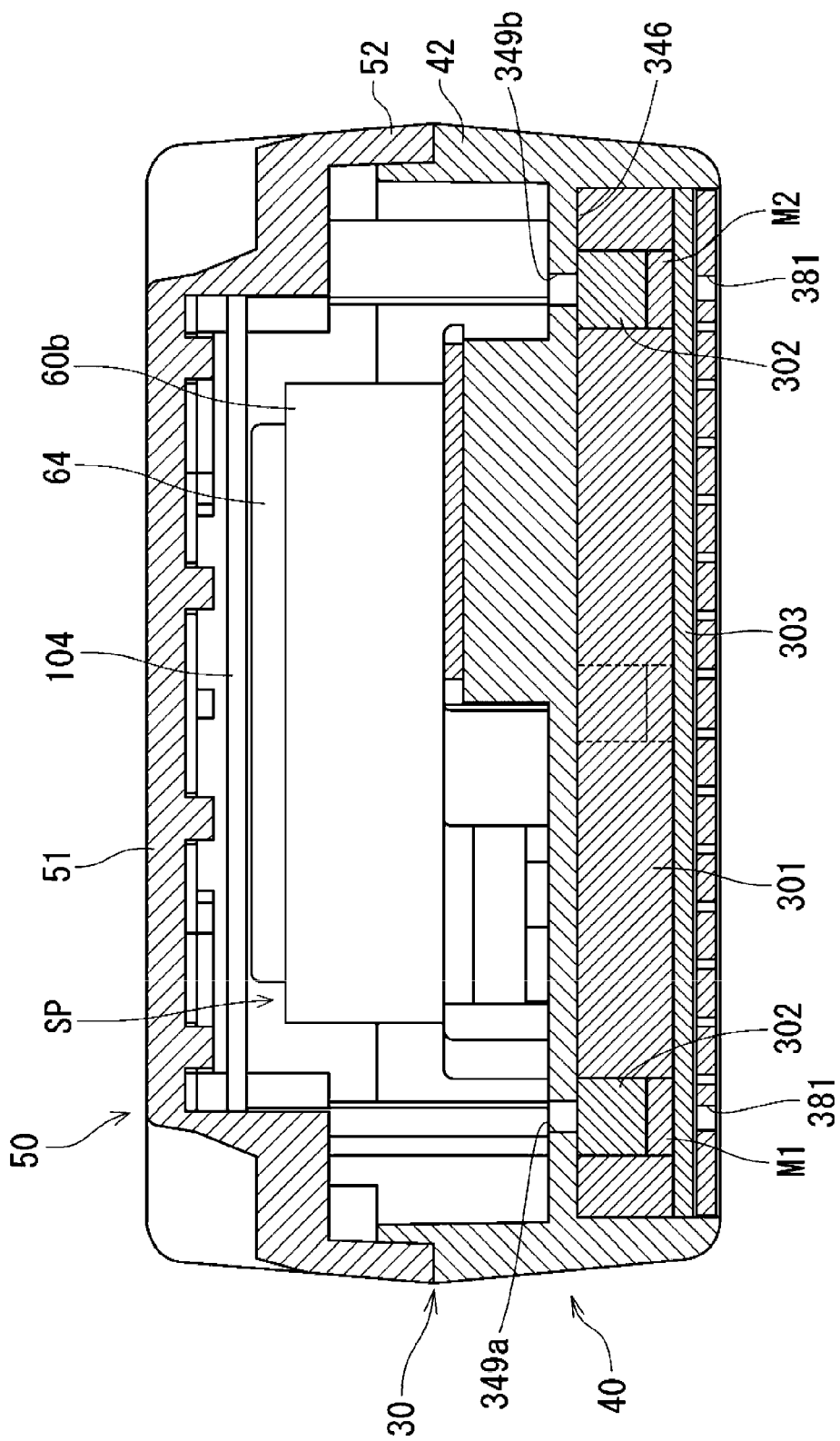
FIG. 30 is a sectional view taken along line B-B in FIG. 26.
Figure 31:
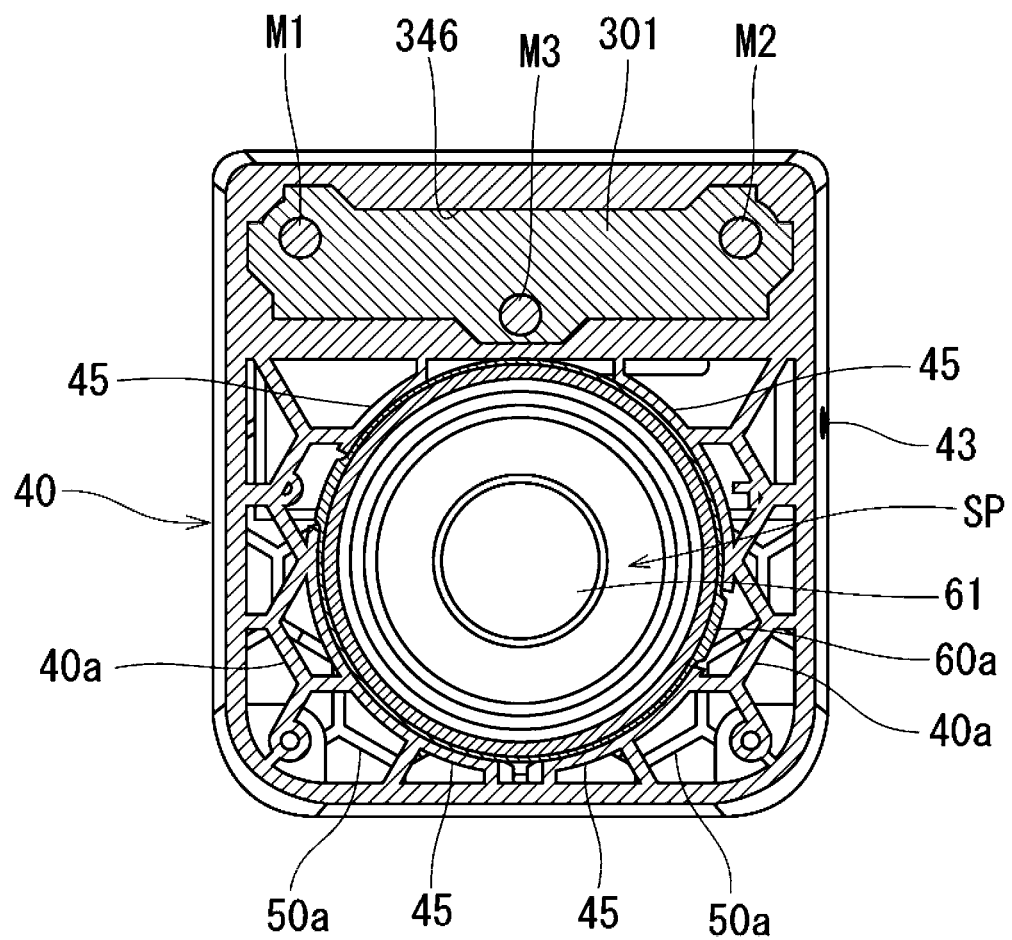
FIG. 31 is a sectional view corresponding to FIG. 15 of the first embodiment.

FIG. 26 shows a front view of a speech communication device 300 of a third embodiment. FIG. 27 shows an exploded perspective view showing a structure for housing microphones M1, M2, and M3 when a front surface of the speech communication device 300 is directed upward. FIGS. 28A to 28D show exploded front views showing a structure for housing the microphones M1, M2, and M3, FIG. 28A shows a front view of a microphone housing recessed part 346 (a front view of a microphone cover 380), FIG. 28B shows a front view of the microphone housing recessed part 346 when the microphone cover 380 in FIG. 28A is drawn transparent, FIG. 28C shows a front view of the microphone housing recessed part 346 when a microphone front face pressing sponge 303 in FIG. 28B is drawn transparent, and FIG. 28D is a front view of the microphone housing recessed part 346 when a microphone fixing sponge 301, the microphones M1, M2, and M3, and microphone back face pressing sponges 302 in FIG. 28C are drawn transparent. FIG. 29 shows a sectional view taken along line A-A in FIG. 26, and FIG. 30 shows a sectional view taken along line B-B in FIG. 26. Further, a side view of the speech communication device 300 is identical to the side view shown in FIG. 6 of the first embodiment. FIG. 31 is a sectional view corresponding to FIG. 15 (the sectional view taken along line D-D in FIG. 6) of the first embodiment.

In the hands-free speech communication device (hereinafter, referred to as a "speech communication device") 300 for an emergency call system of a speaker and microphone integrated type in which a speaker SP and a microphone M are housed in the same housing 30, there is provided a block-like sponge 301 for fixing (positioning) a microphone, where the sponge 301 is an air permeable cushion member and is formed approximately in the same outer shape as the microphone housing recessed part 346 such that the sponge 301 can be fit into the microphone housing recessed part 346 in a free state. In the microphone fixing sponge 301, there are provided three of first, second, and third microphone housing parts 347a, 347b, and 347c (hereinafter, simply referred to as the "microphone housing part 347a," the "microphone housing part 347b," and the "microphone housing part 347c"), and the microphone housing parts 347a, 347b, and 347c are constituted by circular through holes which have approximately the same diameters as the microphones M1, M2, and M3 and can separately house the microphones M1, M2, and M3 in a free state. With this arrangement, the microphone fixing sponge 301 reduces the vibration transferred from the speaker SP to the microphones M1, M2, and M3 through the housing 30.

Further, there are provided: cylinder-shaped microphone back face pressing sponges 302 which have approximately the same diameters as the microphones M1, M2, and M3 and are put into the microphone housing parts 347a, 347b, and 347c prior to the microphones M1, M2, and M3 in a free state so as to press the back surfaces of the microphones M1, M2, and M3; and plate-shaped microphone front face pressing sponge 303 which is formed to have approximately the same outer shape as the microphone housing recessed part 346 and is stacked in front of the microphone fixing sponge 301 so as to press sound collection surfaces (front surfaces) of the microphones M1, M2, and M3.

In order to put the microphones M1, M2, and M3 into the microphone housing recessed part 346, the microphone fixing sponge 301 is put into the microphone housing recessed part 346 from the front surface side of the housing 30 (from ahead of the front face plate 41 of the front case 40), the microphone back face pressing sponges 302 is put into the microphone housing parts 347a, 347b, and 347c of the microphone fixing sponge 301, and the microphones M1, M2, and M3 is put into the microphone housing parts 347a, 347b, and 347c. Then, after the microphone front face pressing sponge 303 is stacked on the front surface of the microphone fixing sponge 301, the microphone cover 380 is put into the microphone housing recessed part 346 from the front surface side of the housing 30, and the microphone cover 380 is then fixed on the housing 30, so that the microphones M1, M2, and M3 are disposed to be housed in the microphone housing recessed part 346 of the housing 30 at the same position and in the same posture as in the first embodiment.

Further, there are protrudingly provided cover abutting parts 304 on a peripheral wall part of the microphone housing recessed part 346, and the cover abutting parts 304 are provided to support the microphone cover 380 at an opening of the microphone housing recessed part 346 such that, when the microphone cover 380 is put into the microphone housing recessed part 346 from the front surface side of the housing 30, an outer peripheral part of the inner surface of the microphone cover 380 is in contact with the cover abutting parts 304 and the outer surface of the microphone cover 380 is flush with the front surface of the housing 30. The microphone cover 380 is fixed with two-sided adhesive tape (not shown) stuck to front end surfaces of the cover abutting parts 304.

Further, in the microphone cover 380, there are provided sound collection holes 381 constituted by many small holes on the area except the outer peripheral part of the microphone cover 380.

Further, in a bottom surface of the microphone housing recessed part 346, there are provided three of first, second, and third lead wire holes 349a, 349b, and 349c to face rear end faces of the microphone back face pressing sponges 302 so that the lead wires of the microphones M1, M2, and M3 can be drawn into the inner surface side (the inner surface side of the front face plate 41 of the front case 40) of the housing 30.

As described above, in the speech communication device 300 of the present embodiment, provided is the air permeable microphone fixing sponge 301 which can be fit into the microphone housing recessed part 346; and in the microphone fixing sponge 301, the microphone housing parts 347a, 347b, and 347c are provided so as to separately house the microphones M1, M2, and M3. With this arrangement, the microphone fixing sponge 301 can reduce the vibration transferred from the speaker SP to the microphones M1, M2, and M3 through the housing 30.

Fourth Embodiment

Figure 32:
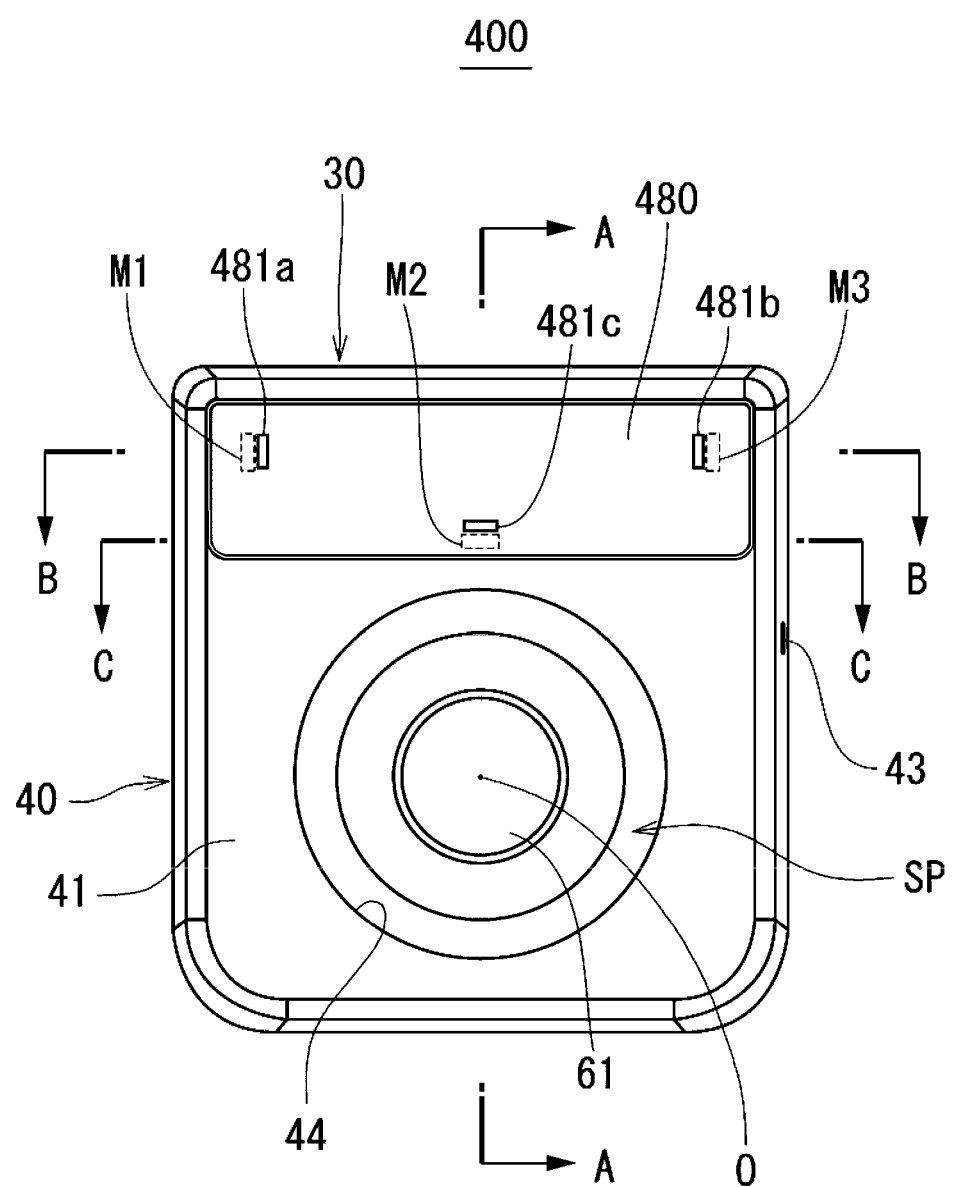
FIG. 32 is a front view of a speech communication device of a fourth embodiment.
Figure 33:
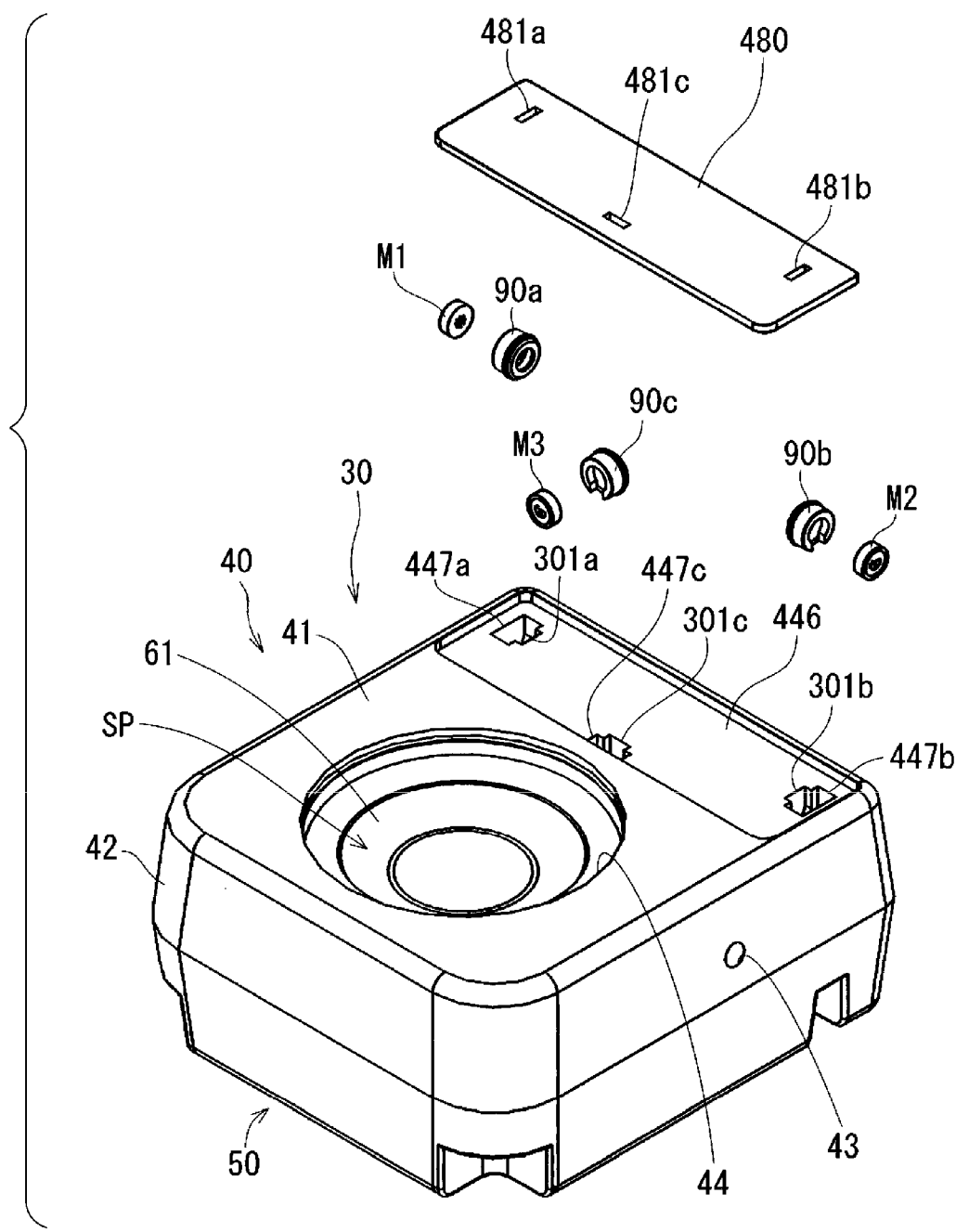
FIG. 33 is an exploded perspective view showing a structure for housing microphones when a front surface of the speech communication device is directed upward.
Figure 34A:
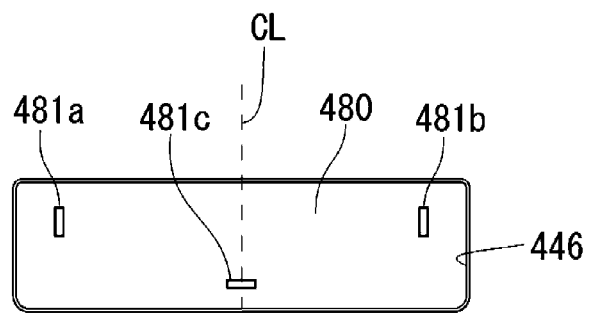
FIGS. 34A to 34C are exploded front views showing a structure for housing the microphones.
Figure 34B:
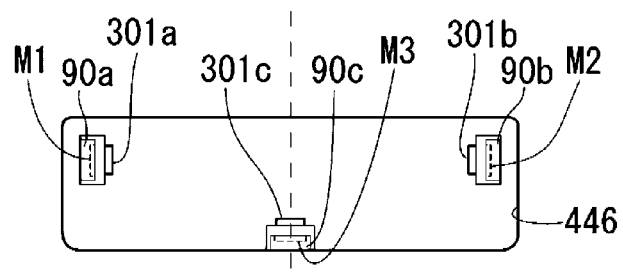
Figure 34C:
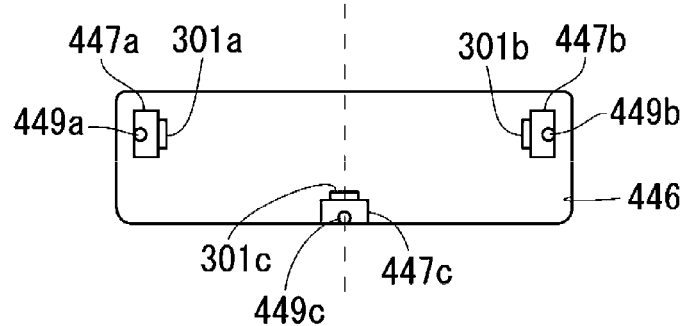
Figure 35:
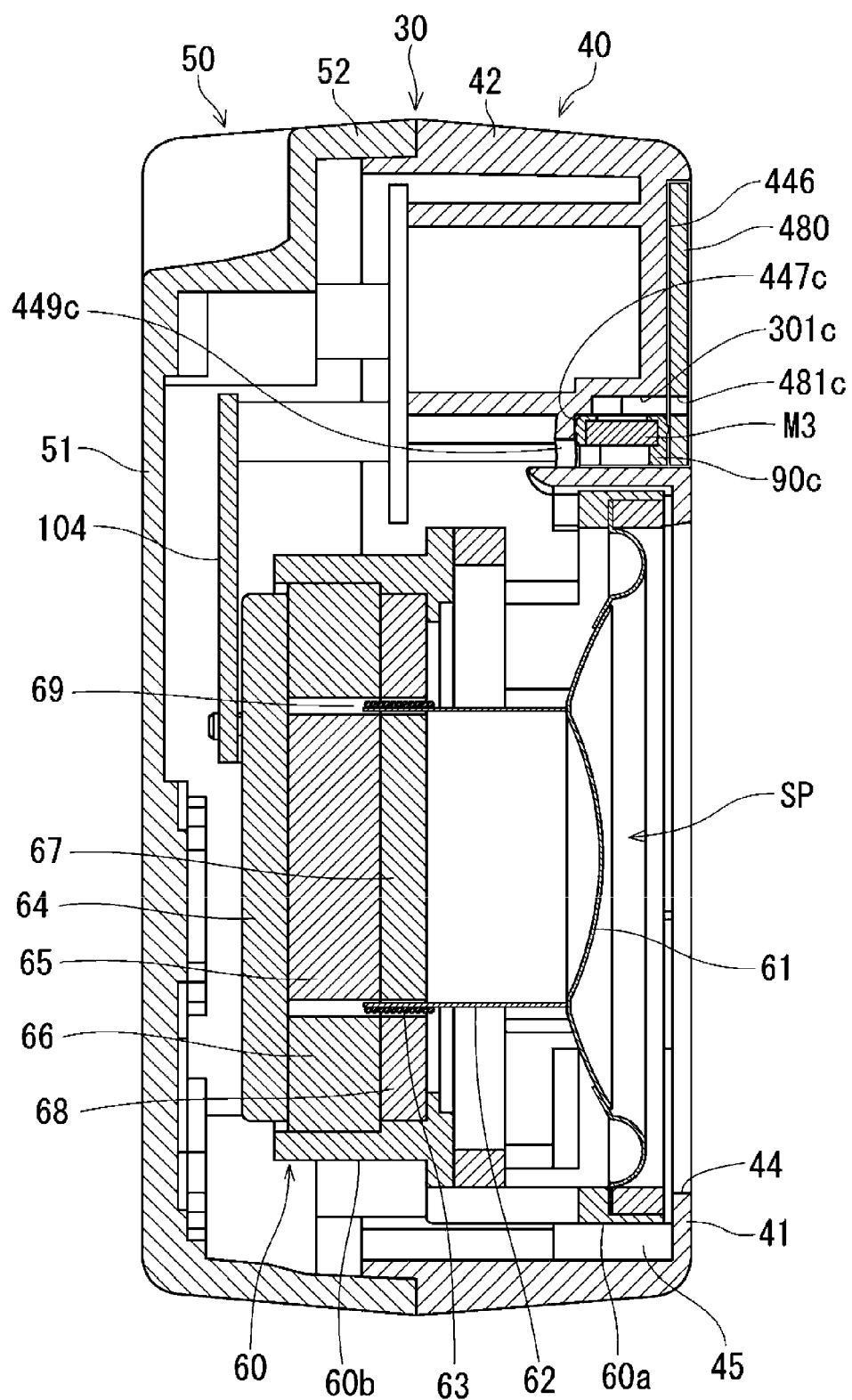
FIG. 35 is a sectional view taken along line A-A in FIG. 32.
Figure 36:
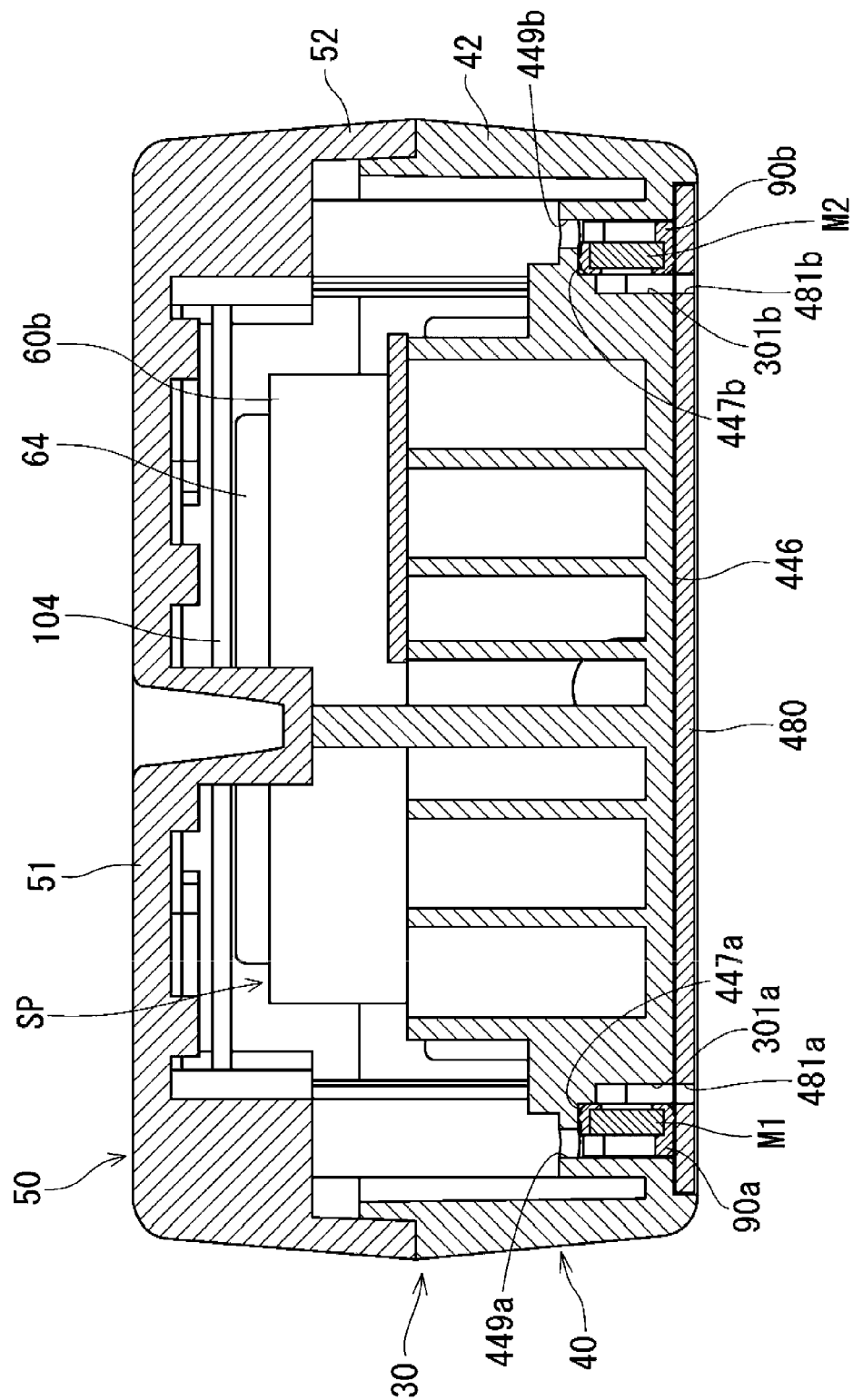
FIG. 36 is a sectional view taken along line B-B in FIG. 32.
Figure 37:
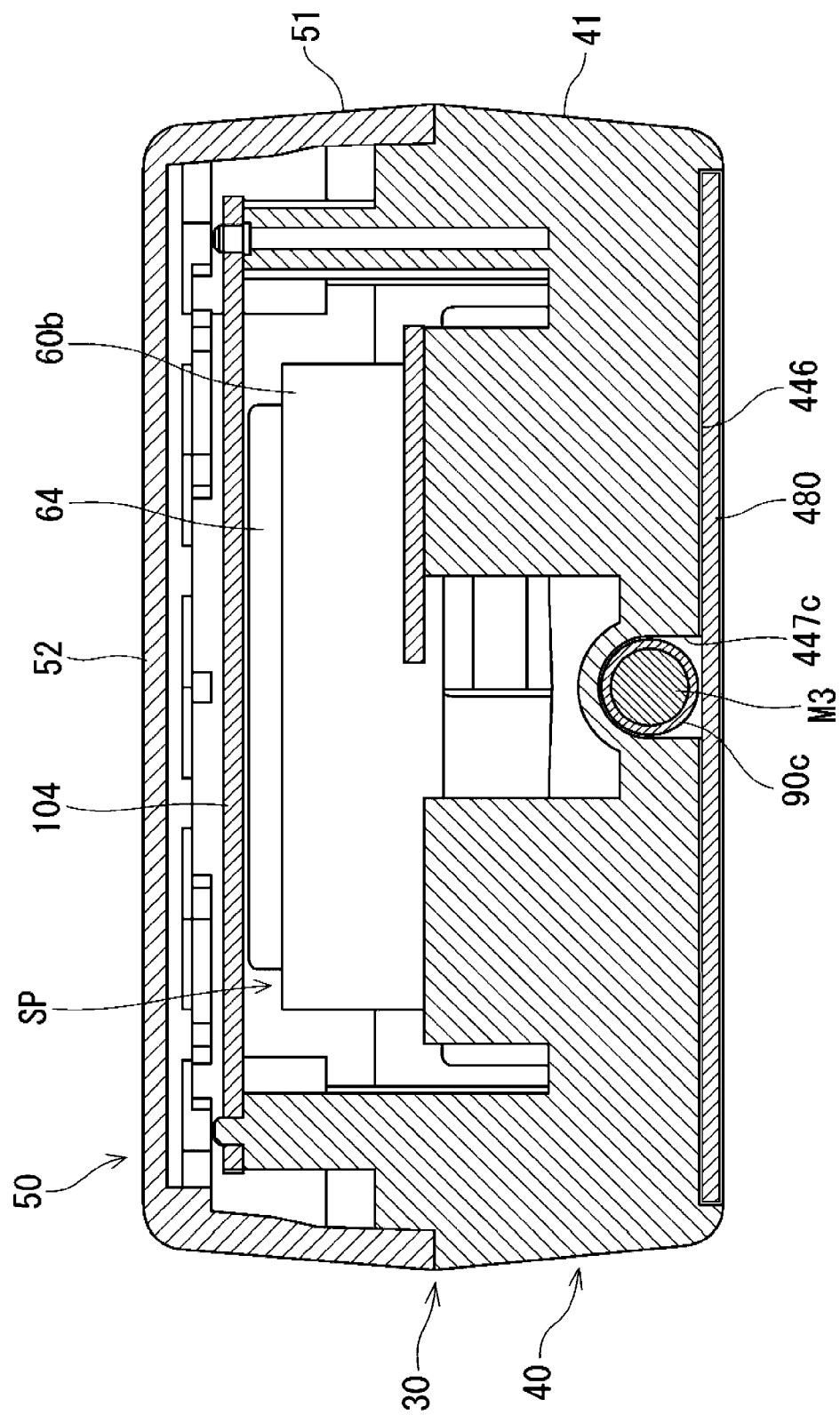
FIG. 37 is a sectional view taken along line C-C in FIG. 32.
Figure 38:
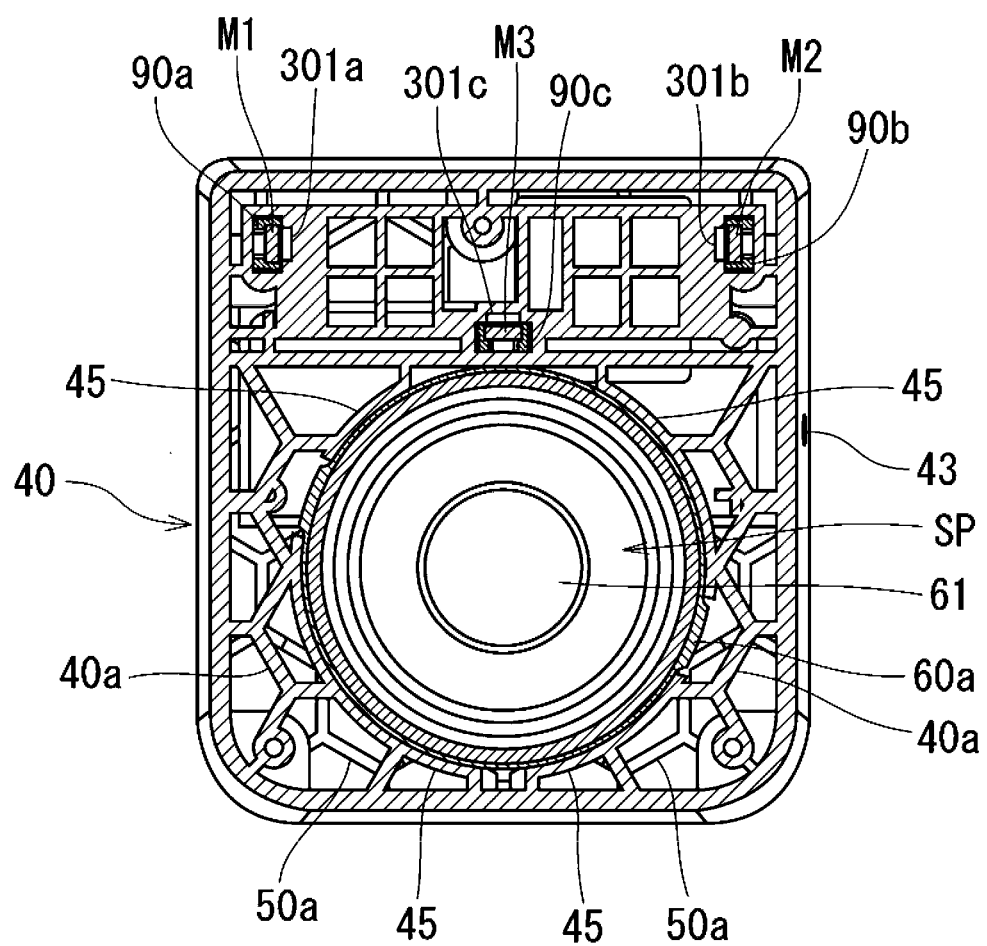
FIG. 38 is a sectional view corresponding to FIG. 15 of the first embodiment.

FIG. 32 shows a front view of a speech communication device 400 of a fourth embodiment. FIG. 33 shows an exploded perspective view showing a structure for housing microphones M1, M2, and M3 when a front surface of the speech communication device 400 is directed upward. FIGS. 34A to 34C show exploded front views showing a structure for housing the microphones M1, M2, and M3, FIG. 34A shows a front view of a microphone housing recessed part 446 (a front view of a microphone cover 480), FIG. 34B shows a front view of the microphone housing recessed part 446 when the microphone cover 480 in FIG. 34A is drawn transparent, and FIG. 34C shows a front view of the microphone housing recessed part 446 when the microphones M1, M2, and M3 and microphone holders 90a, 90b, and 90c in FIG. 34B are drawn transparent. FIG. 35 shows a sectional view taken along line A-A in FIG. 32, FIG. 36 shows a sectional view taken along line B-B in FIG. 32, and FIG. 37 shows a sectional view taken along line C-C in FIG. 32. Further, a side view of the speech communication device 400 is approximately identical to the side view shown in FIG. 6 of the first embodiment. FIG. 38 is a sectional view corresponding to FIG. 15 (the sectional view taken along line D-D in FIG. 6) of the first embodiment.

In the speech communication devices 20, 200, and 300 of the first to third embodiments, the microphones M1, M2, and M3 are disposed such that the diaphragms 74 of the microphones vibrate in the same direction as the vibration direction of the diaphragm 61 of the speaker SP (the front and back direction). In other words, the microphones M1, M2, and M3 are disposed to be housed in the microphone housing parts 47a, 47b, and 47c; 247a, 247b, and 247c; and 347a, 347b, and 347c of the microphone housing recessed parts 46, 246, and 346 such that the sound collection surfaces (front surfaces) of the microphones M1, M2, and M3 are directed toward the front surface of the housing 30. However, in the hands-free speech communication device for an emergency call system of a speaker and microphone integrated type (hereinafter, referred to a "speech communication device") 400 of the present invention in which the speaker SP and the microphone M are housed in the same housing 30, the microphones M1, M2, and M3 are disposed to be housed in the microphone housing recessed part 446 such that the diaphragms 74 of the microphones M1, M2, and M3 vibrate in the direction perpendicular to the vibration direction of the diaphragm 61 of the speaker SP (a right and left direction and a vertical direction), in other words, such that the side surfaces of the microphones M1, M2, and M3 are directed to the front surface of the housing 30. This arrangement reduces the influence of the vibration transferred from the speaker SP to the microphones M1, M2, and M3 through the housing 30 to the microphones M1, M2, and M3.

The microphone housing recessed part 446 is formed, above the sound emission hole 44 in the front surface of the housing 30, in a rectangular recessed part in which the microphone cover 480 formed in a rectangular plate-shape is closely fit. In the bottom of the rectangular recessed part, there are provided: three of first, second, and third microphone housing parts 447a, 447b, and 447c (hereinafter, simply referred to as the "microphone housing part 447a," the "microphone housing part 447b," and the "microphone housing part 447c") which are constituted by recessed parts in rectangular shapes (the shapes when the housing 30 is viewed from the front surface) and respectively house the microphones M1, M2, and M3 and the microphone holders 90a, 90b, and 90c externally fit on the microphones M1, M2, and M3; and three of first, second, and third sound paths 301a, 301b, and 301c which are constituted by recessed parts having rectangular shapes (the shapes when the housing 30 is viewed from the front surface) and are respectively formed in first side surfaces of the microphone housing parts 447a, 447b, and 447c. In the bottom surfaces of the microphone housing parts 447a, 447b, and 447c, there are formed three of first, second, and third lead wire holes 449a, 449b, and 449c for drawing lead wires (not shown) led from the printed circuit boards 70 of the microphones M1, M2, and M3 into the inner surface side (the inner surface side of the front face plate 41 of the front case 40) of the housing 30. Further, sound collection holes 481a, 481b, and 481c of the microphone cover 480 are provided at three positions facing the sound paths 301a, 301b, and 301c.

Further, the microphone housing parts 447a and 447b for housing the microphones M1 and M2 for beamforming are formed such that the first side surfaces forming the sound paths 301a and 301b of the microphone housing parts 447a and 447b are formed to face each other in the width direction (right and left direction) of the housing 30, and the microphones M1 and M2 are housed such that the sound collection surfaces of the microphones M1 and M2 face each other in the width direction of the housing 30. On the other hand, the microphone housing part 447c for housing the microphone M3 for cancelling echo is formed such that the first side surface forming the sound path 301c of the microphone housing part 447c is directed in the direction opposite to the speaker SP (upward), and the microphone M3 is housed with the back surface of the microphone M3 directed to the side of the speaker SP (downward).

Then, after the microphones M1, M2, and M3 are put into the microphone housing parts 447a, 447b, and 447c, together with microphone holders 90a, 90b, and 90c, in the microphone housing recessed part 446 from the front surface side of the housing 30 (from ahead of the front face plate 41 of the front case 40), the microphone cover 480 is fit into the microphone housing recessed part 446 from the front surface side of the housing 30 to fix the microphone cover 480 on the housing 30; thus, the microphones M1, M2, and M3 are disposed to be held in the microphone housing recessed part 446 at the same positions as in the first embodiment while the microphones M1, M2, and M3 are pressed by the inner surface of the microphone cover 480 and while the sound collection holes 81a, 81b, and 81c are opposite to the sound paths 301a, 301b, and 301c. The microphone cover 480 is fixed on the microphone housing recessed part 446 with a two-sided adhesive tape (not shown) on an inner surface of the microphone cover 480.

As described above, in the speech communication device 400 of the present embodiment, the microphones M1, M2, and M3 are disposed such that the diaphragms 74 of the microphones M1, M2, and M3 vibrate in the direction perpendicular to the vibration direction of the diaphragm 61 of the speaker SP (a right and left direction and a vertical direction). This arrangement can reduce influence of the vibration transferred from the speaker SP to the microphones M1, M2, and M3 through the housing 30 to the microphones M1, M2, and M3.

What is claimed is:

1. A hands-free speech communication device for an emergency call system, the hands-free speech communication device comprising:
    a housing disposed in a vehicle cabin;
    a speaker which is housed in the housing and outputs from a first surface of the housing a reception sound of a communication party;
    a plurality of microphones which are housed in the housing and collect sound from the first surface of the housing, the microphones including:
        a first omnidirectional microphone and a second omnidirectional microphone disposed at positions which are axisymmetric with a line segment as a symmetric axis, the line segment extending in a radial direction from a center of a diaphragm of the speaker; and
        a third omnidirectional microphone disposed at a position which is on the symmetric axis and is closer to the speaker than the first omnidirectional microphone and the second omnidirectional microphone are; and
    a sound processor including:
        a beam former which is connected to the first omnidirectional microphone and the second omnidirectional microphone and forms a bidirectionality in which directionality is strong in two directions each perpendicular to the symmetric axis and is weak in two directions each along the symmetric axis; and
        an echo cancel unit which is connected to the beam former and the third omnidirectional microphone and removes a sound signal having been output from the third omnidirectional microphone from a sound signal having been output from the beam former.

2. The hands-free speech communication device for an emergency call system according to claim 1, wherein the housing is disposed at a ceiling central part between a left sun visor and a right sun visor in the vehicle cabin such that the first surface of the housing is directed downward, the microphones are located behind the speaker, and the symmetric axis extends in a front and back direction of a vehicle.

3. The hands-free speech communication device for an emergency call system according to claim 1, wherein, on the first surface of the housing, there are provided
   a sound emission hole provided at a position facing the diaphragm of the speaker;
   a plurality of microphone housing recessed parts which house the microphones;
   a microphone cover which covers the plurality of microphone housing recessed parts; and
   sound collection holes provided in the microphone cover.

4. The hands-free speech communication device for an emergency call system according to claim 1, wherein, on the first surface of the housing, there are provided
   a sound emission hole provided at a position facing the diaphragm of the speaker;
   a plurality of microphone housing recessed parts which house the microphones;
   a microphone cover which covers the plurality of microphone housing recessed parts; and
   sound collection holes provided in the microphone cover,
   wherein the plurality of microphone housing recessed parts include a first microphone housing part, a second microphone housing part, and a third microphone housing part each provided to house each of the microphones.

5. The hands-free speech communication device for an emergency call system according to claim 1, wherein, on the first surface of the housing, there are provided
   a sound emission hole provided at a position facing the diaphragm of the speaker;
   a plurality of microphone housing recessed parts which house the microphones;
   a microphone cover which covers the plurality of microphone housing recessed parts; and
   sound collection holes provided in the microphone cover,
   wherein the plurality of microphone housing recessed parts include a first microphone housing part, a second microphone housing part, and a third microphone housing part each provided to house each of the microphones, and
   wherein the hands-free speech communication device comprises microphone holders, which are made of a resilient material and are respectively housed, together with the microphones, in the first microphone housing part, the second microphone housing part, and the third microphone housing part such that the microphone holders are fit on outer circumferences of the microphones and are respectively held between outer circumferential surfaces of the microphones and inner peripheral surfaces of the first microphone housing part, the second microphone housing part, and the third microphone housing part.

6. A hands-free speech communication device for an emergency call system, the hands-free speech communication device comprising:
   a housing disposed in a vehicle cabin;
   a speaker which is housed in the housing and outputs from a first surface of a housing a reception sound of a communication party;
   a plurality of microphones which are housed in the housing and collects sound from the first surface of the housing, the microphones including:
      a first omnidirectional microphone and a second omnidirectional microphone disposed at positions which are axisymmetric with a line segment as a symmetric axis, the line segment extending in a radial direction from a center of a diaphragm of the speaker; and
      a third omnidirectional microphone disposed at a position which is on the symmetric axis and is closer to the speaker than the first omnidirectional microphone and the second omnidirectional microphone are; and
   a sound processor including:
      a beam former which is connected to the first omnidirectional microphone and the second omnidirectional microphone and forms a bidirectionality in which directionality is strong in two directions each perpendicular to the symmetric axis and is weak in two directions each along the symmetric axis; and
      an echo cancel unit which is connected to the beam former and the third omnidirectional microphone and removes a sound signal having been output from the third omnidirectional microphone from a sound signal having been output from the beam former,
   wherein, on the first surface of the housing, there are provided a sound emission hole provided at a position facing the diaphragm of the speaker;
   a plurality of microphone housing recessed parts which house the microphones;
   a microphone cover which covers the plurality of microphone housing recessed parts; and
   sound collection holes provided in the microphone cover, and
   wherein the hands-free speech communication device comprises a first microphone housing part, a second microphone housing part, and a third microphone housing part each of which is provided in the microphone cover to house each of the microphones such that the first microphone housing part, the second microphone housing part, and the third microphone housing part project from an inner surface of the microphone cover; and
   a cushion member both surfaces of which are given adhesiveness and which are provided to fix the microphone cover on the microphone housing recessed part, wherein a gap is provided between the microphone housing recessed part and the microphone cover.

7. The hands-free speech communication device for an emergency call system according to claim 6, wherein the housing is disposed at a ceiling central part between a left sun visor and a right sun visor in the vehicle cabin such that the first surface of the housing is directed downward, the microphone is located behind the speaker, and the symmetric axis extends in a front and back direction of a vehicle.

8. The hands-free speech communication device for an emergency call system according to claim 6, comprising microphone holders, which are made of a resilient material and are respectively housed, together with the microphones, in the first microphone housing part, the second microphone housing part, and the third microphone housing part such that the microphone holders are fit on outer circumferences of the microphones and are respectively held between outer circumferential surfaces of the microphones and inner peripheral surfaces of the first microphone housing part, the second microphone housing part, and the third microphone housing part.

9. A hands-free speech communication device for an emergency call system, the hands-free speech communication device comprising:
- a housing disposed in a vehicle cabin;
- a speaker which is housed in the housing and outputs from a first surface of the housing a reception sound of a communication party;
- a plurality of microphones which are housed in the housing and collects sound from the first surface of the housing, the microphones including:
  - a first omnidirectional microphone and a second omnidirectional microphone disposed at positions which are axisymmetric with a line segment as a symmetric axis, the line segment extending in a radial direction from a center of a diaphragm of the speaker; and
  - a third omnidirectional microphone disposed at a position which is on the symmetric axis and is closer to the speaker than the first omnidirectional microphone and the second omnidirectional microphone are; and
- a sound processor including:
  - a beam former which is connected to the first omnidirectional microphone and the second omnidirectional microphone and forms a bidirectionality in which directionality is strong in two directions each perpendicular to the symmetric axis and is weak in two directions each along the symmetric axis; and
  - an echo cancel unit which is connected to the beam former and the third omnidirectional microphone and removes a sound signal having been output from the third omnidirectional microphone from a sound signal having been output from the beam former,
- wherein, on the first surface of the housing, there are provided a sound emission hole provided at a position facing the diaphragm of the speaker;
- a plurality of microphone housing recessed parts which house the microphones;
- a microphone cover which covers the plurality of microphones housing recessed parts; and
- sound collection holes provided in the microphone cover, and
- wherein the hands-free speech communication device comprises an air permeable cushion member which is to be fit in the plurality of microphone housing recessed parts; and
- a first microphone housing part, a second microphone housing part, and a third microphone housing part provided on the cushion member such that the first microphone housing part, the second microphone housing part, and the third microphone housing part each house each of the microphones.

10. The hands-free speech communication device for an emergency call system according to claim 9, wherein the housing is disposed at a ceiling central part between a left sun visor and a right sun visor in the vehicle cabin such that the first surface of the housing is directed downward, the microphone is located behind the speaker, and the symmetric axis extends in a front and back direction of a vehicle.

11. A hands-free speech communication device for an emergency call system, the hands-free speech communication device comprising:
- a housing disposed in a vehicle cabin;
- a speaker which is housed in the housing and outputs from a first surface of the housing a reception sound of a communication party;
- a plurality of microphones which are housed in the housing and collects sound from the first surface of the housing, the microphones including:
  - a first omnidirectional microphone and a second omnidirectional microphone disposed at positions which are axisymmetric with a line segment as a symmetric axis, the line segment extending in a radial direction from a center of a diaphragm of the speaker; and
  - a third omnidirectional microphone disposed at a position which is on the symmetric axis and is closer to the speaker than the first omnidirectional microphone and the second omnidirectional microphone are; and
- a sound processor including:
  - a beam former which is connected to the first omnidirectional microphone and the second omnidirectional microphone and forms a bidirectionality in which directionality is strong in two directions each perpendicular to the symmetric axis and is weak in two directions each along the symmetric axis; and
  - an echo cancel unit which is connected to the beam former and the third omnidirectional microphone and removes a sound signal having been output from the third omnidirectional microphone from a sound signal having been output from the beam former,
- wherein the microphones are disposed such that a diaphragm of each of the microphones vibrates in two directions each perpendicular to a vibration direction of the diaphragm of the speaker.

12. The hands-free speech communication device for an emergency call system according to claim 11, wherein the housing is disposed at a ceiling central part between a left sun visor and a right sun visor in the vehicle cabin such that the first surface of the housing is directed downward, the microphone is located behind the speaker, and the symmetric axis extends in a front and back direction of a vehicle.

13. The hands-free speech communication device for an emergency call system according to claim 11, wherein, on the first surface of the housing, there are provided
- a sound emission hole provided at a position facing the diaphragm of the speaker;
- a plurality of microphone housing recessed parts which house the microphones;
- a microphone cover which covers the plurality of microphones housing recessed parts; and
- sound collection holes provided in the microphone cover.

14. The hands-free speech communication device for an emergency call system according to claim 11, wherein, on the first surface of the housing, there are provided
- a sound emission hole provided at a position facing the diaphragm of the speaker;
- a plurality of microphone housing recessed parts which house the microphones;
- a microphone cover which covers the plurality of microphone housing recessed parts; and
- sound collection holes provided in the microphone cover,
- wherein the plurality of microphone housing recessed parts include a first microphone housing part, a second microphone housing part, and a third microphone housing part each provided to house each of the microphones.

15. The hands-free speech communication device for an emergency call system according to claim 11, wherein, on the first surface of the housing, there are provided
- a sound emission hole provided at a position facing the diaphragm of the speaker;

a plurality of microphone housing recessed parts which house the microphones;
a microphone cover which covers the plurality of microphone housing recessed parts; and
sound collection holes provided in the microphone cover,
wherein the plurality of microphone housing recessed parts include a first microphone housing part, a second microphone housing part, and a third microphone housing part each provided to house each of the microphones, and
wherein the hands-free speech communication device comprises microphone holders, which are made of a resilient material and are respectively housed, together with the microphones, in the first microphone housing part, the second microphone housing part, and the third microphone housing part such that the microphone holders are fit on outer circumferences of the microphones and are respectively held between outer circumferential surfaces of the microphones and inner peripheral surfaces of the first microphone housing part, the second microphone housing part, and the third microphone housing part.

* * * * *